US007537382B2

(12) United States Patent
Ibuki et al.

(10) Patent No.: US 7,537,382 B2
(45) Date of Patent: May 26, 2009

(54) METHOD OF ESTIMATING TEMPERATURE OF GAS MIXTURE FOR INTERNAL COMBUSTION ENGINE

(75) Inventors: Taku Ibuki, Susono (JP); Shigeki Nakayama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 366 days.

(21) Appl. No.: 10/584,940

(22) PCT Filed: Feb. 8, 2005

(86) PCT No.: PCT/JP2005/002188

§ 371 (c)(1),
(2), (4) Date: Jul. 5, 2006

(87) PCT Pub. No.: WO2005/075802

PCT Pub. Date: Aug. 18, 2005

(65) Prior Publication Data

US 2009/0097525 A1 Apr. 16, 2009

(30) Foreign Application Priority Data

Feb. 10, 2004 (JP) ............................... 2004-32950

(51) Int. Cl.
*G01K 13/02* (2006.01)

(52) U.S. Cl. ......................... 374/144; 374/29; 374/135; 73/23.25

(58) Field of Classification Search ......... 374/141-144, 374/29, 43-44, 40, 147, 148, 30, 135, 110, 374/112; 701/104, 110-111; 60/301, 285, 60/274, 278, 276; 123/568.11, 568.12, 568.16, 123/435, 704, 406.45, 406.46; 73/23.25, 73/23.26
See application file for complete search history.

(56) References Cited

U.S. PATENT DOCUMENTS 2,736,167 A * 2/1956 Teargue .................. 60/39.281

(Continued)

FOREIGN PATENT DOCUMENTS

EP 1 342 899 A1 9/2003

(Continued)

OTHER PUBLICATIONS

Yutaro Wakuri et al., "Studies on the Penetration of Fuel Spray of Diesel Engine," The Transactions of the Japanese Society of Mechanical Engineers, 25-156, pp. 820-826, 1959.

(Continued)

*Primary Examiner*—Gail Verbitsky
(74) *Attorney, Agent, or Firm*—Oliff & Berridge, PLC

(57) ABSTRACT

In a gas mixture temperature estimation method for an internal combustion engine, before a forefront portion of a gas mixture reaches an inner wall surface of the combustion chamber, the gas mixture temperature is calculated in accordance with a predetermined equation which is based on the assumption that no head exchange occurs between the gas mixture and cylinder interior gas which exists around the gas mixture without mixing with fuel. After the gas mixture forefront portion reaches the inner wall surface of the combustion chamber, the gas mixture temperature calculated in accordance with the equation is corrected in consideration of the quantity of heat transfer between the gas mixture and the cylinder interior gas and the quantity of heat transfer between the gas mixture and the wall.

14 Claims, 15 Drawing Sheets

U.S. PATENT DOCUMENTS

| | | | | | |
|---|---|---|---|---|---|
| 4,930,309 | A * | 6/1990 | Hartman | 60/267 |
| 5,771,984 | A * | 6/1998 | Potter et al. | 175/14 |
| 6,089,081 | A * | 7/2000 | Cook et al. | 73/114.39 |
| 6,287,534 | B1 * | 9/2001 | Lin | 423/522 |
| 6,367,970 | B1 * | 4/2002 | Danielson | 374/43 |
| 6,530,361 | B1 | 3/2003 | Shiraishi et al. | |
| 7,032,383 | B2 * | 4/2006 | Weber | 60/612 |
| 7,377,687 | B2 * | 5/2008 | Chana | 374/110 |
| 2004/0025838 | A1 | 2/2004 | Fuwa et al. | |
| 2004/0194936 | A1 * | 10/2004 | Torii | 165/151 |
| 2006/0248800 | A1 * | 11/2006 | Miglin et al. | 48/198.7 |
| 2008/0141651 | A1 * | 6/2008 | Eason et al. | 60/39.821 |

FOREIGN PATENT DOCUMENTS

| | | | |
|---|---|---|---|
| JP | 58080446 | A * | 5/1983 |
| JP | 60053741 | A * | 3/1985 |
| JP | 05044479 | A * | 2/1993 |
| JP | 07043250 | A * | 2/1995 |
| JP | 02000161625 | A * | 6/2000 |
| JP | 02000161790 | A * | 6/2000 |
| JP | A 2001-254645 | | 9/2001 |
| JP | A 2002-180894 | | 6/2002 |

OTHER PUBLICATIONS

C. Eiglmeier et al. "A Detailed Phenomenological Model for Wall Heat Transfer Prediction in Diesel Engines," Proceedings Automotive and Transportation Technology Congress and Exhibition, Barcelona, Spain, Oct. 1-3, 2001, SAE, pp. 1-14, Oct. 1, 2001.

A. Laudenbach et al., "Real Time Heat Release Calculation For Combustion Engines," Proceedings of the International Symposium on Automotive Technology and Automation (ISATA). Florence, May 20-24, 1991, Croydon, Automotive Automation, GB, vol. SYMP. 24, pp. 733-740, May 20, 1991.

* cited by examiner

METHOD OF ESTIMATING TEMPERATURE OF GAS MIXTURE FOR INTERNAL COMBUSTION ENGINE

TECHNICAL FIELD

The present invention relates to a gas mixture temperature estimation method for an internal combustion engine, which method estimates the temperature of a gas mixture produced through mixing of fuel injected into a combustion chamber of an internal combustion engine and a gas having been taken into the combustion chamber (hereinafter referred to as "cylinder interior gas").

BACKGROUND ART

The amount of emissions, such as $NO_x$, discharged from an internal combustion engine such as a spark-ignition internal combustion engine or a diesel engine has a strong correlation with the flame temperature (combustion temperature) after ignition. Therefore, controlling the flame temperature to a predetermined temperature effectively reduces the amount of emissions, such as $NO_x$. In general, since flame temperature cannot be detected directly, the flame temperature must be estimated so as to be controlled to the predetermined temperature. Meanwhile, the flame temperature changes with the temperature of a gas mixture before being ignited (hereinafter, may be simply referred to as "gas mixture temperature"). Accordingly, estimating the gas mixture temperature is effective for estimation of the flame temperature.

In particular, in the case of a diesel engine in which air-fuel mixture starts combustion by means of self ignition caused by compression, the ignition timing must be properly controlled in accordance with the operation state of the engine. The ignition timing greatly depends on the gas mixture temperature before ignition. Accordingly, estimating the gas mixture temperature is also necessary for proper control of the ignition timing.

In view of the above, a fuel injection apparatus for a diesel engine disclosed in Japanese Patent Application Laid-Open (kokai) No. 2001-254645 sets a target ignition timing in accordance with the operation state of an engine, and estimates the gas mixture temperature as measured at the target ignition timing on the basis of various operational state quantities which affect the gas mixture temperature, such as engine coolant temperature, intake air temperature, and intake pressure. Subsequently, the apparatus controls the manner of injection (e.g., injection timing and/or injection pressure) of fuel in such a manner that the estimated gas mixture temperature attains a predetermined temperature, to thereby control the ignition timing to coincide with the target ignition timing.

Incidentally, depending on the operation state of an engine, a gas mixture which is produced through mixing of fuel injected into a combustion chamber and a cylinder interior gas is often ignited after the gas mixture reaches the inner wall surface of the combustion chamber. In such case, the gas mixture can be considered (assumed) to stagnate in a generally annular configuration in the vicinity of the side wall (having a generally cylindrical inner wall surface) of the combustion chamber after having reached the inner wall surface of the combustion chamber and at least until ignition of the gas mixture. During such a period in which the gas mixture is stagnant, the temperature of the gas mixture is affected by heat transfer between the gas mixture, and the combustion chamber wall and the like existing around the gas mixture.

However, the above-described conventional apparatus estimates such a gas mixture temperature without consideration of the influence of the above-described heat transfer. Therefore, the estimated gas mixture temperature involves an error, and as a result the conventional apparatus cannot render the ignition timing coincident with the target ignition timing.

DISCLOSURE OF THE INVENTION

In view of the foregoing, an object of the present invention is to provide a gas mixture temperature estimation method for an internal combustion engine which can accurately estimate the temperature of a gas mixture even when the gas mixture is considered to stagnate in the vicinity of the side wall of a combustion chamber.

A gas mixture temperature estimation method for an internal combustion engine according to the present invention estimates the temperature of a gas mixture produced through mixing of fuel injected (directly) into a combustion chamber of the internal combustion engine and a gas having been taken into the combustion chamber (cylinder interior gas), under the assumption that the gas mixture stagnates in a generally annular configuration in the vicinity of a side wall (having a generally cylindrical inner wall surface) of the combustion chamber, and heat transfer occurs between the gas mixture and an object or substance existing around the gas mixture during a period in which the gas mixture stagnates.

The term "gas mixture" used herein encompasses not only a gas mixture before being ignited, but also a gas produced through combustion of the gas mixture (hereinafter referred to as "post-ignition gas mixture"). In other words, the term "gas mixture" encompasses a gas related to combustion, whether the gas is a gas mixture before being ignited or a post-ignition gas mixture. The term "side wall of the combustion chamber" refers to, but is not limited to, the side wall of a cylinder, or the side wall of a cylindrical depression (hereinafter referred to as a "cavity") which is formed on the top surface of a piston concentrically with the center axis of the piston.

According to the method of the present invention, in the case where a gas mixture is considered to stagnate in a generally annular configuration in the vicinity of a side wall of a combustion chamber, the temperature of the gas mixture can be accurately estimated in consideration of the influence of heat transfer which takes place between the gas mixture and an object or substance existing around the gas mixture during a period in which the gas mixture stagnates. Examples of the "case (period) in which a gas mixture stagnates in a generally annular configuration in the vicinity of a side wall of a combustion chamber" include a period between a point in time when a gas mixture reaches the inner wall surface of the combustion chamber and a point in time when the gas mixture is ignited, and a period between the time of ignition and a point in time when a post-ignition gas mixture is discharged to the outside of the combustion chamber.

In this case, preferably, the temperature of the gas mixture is estimated under the assumption that the stagnation of the gas mixture occurs after the gas mixture (specifically, a forefront portion of the gas mixture) reaches the inner wall surface of the combustion chamber. This assumption enables performances of an estimation operation of determining the position of a forefront portion of a gas mixture in a combustion chamber as a function of time elapsed after the start of fuel injection in accordance with a predetermined empirical formula, estimating the gas mixture temperature without consideration of the influence of the above-described heat transfer until the forefront portion of the gas mixture is determined to have reached the inner wall surface of the combustion chamber, and estimating the gas mixture temperature in consideration of the influence of the heat transfer which occurs because of stagnation of the gas mixture, after the forefront portion of the gas mixture is determined to have reached the inner wall surface of the combustion chamber. Accordingly, the temperature of the gas mixture can be accurately estimated before and after the forefront portion of the gas mixture reaches the inner wall surface of the combustion chamber.

Preferably, the wall of the combustion chamber in contact with the gas mixture and the cylinder interior gas in contact with the gas mixture are considered as the object or substance which exists around the gas mixture during a period in which the gas mixture stagnates in a generally annular configuration in the vicinity of the side wall of the combustion chamber (i.e., an object which exchanges heat with the gas mixture). When the gas mixture stagnates in a generally annular configuration in the vicinity of the side wall of the combustion chamber, the gas mixture is surrounded by the wall (side wall, bottom wall, etc.) of the combustion chamber, as well as the cylinder interior gas. In other words, the gas mixture comes into contact with the wall of the combustion chamber and the cylinder interior gas, whereby heat transfer takes place between the gas mixture and the wall of the combustion chamber and between the gas mixture and the cylinder interior gas.

Accordingly, when the temperature of the gas mixture is estimated under the assumption that, as described above, heat transfer takes place between the gas mixture and the wall of the combustion chamber in contact with the gas mixture, as well as between the gas mixture and the cylinder interior gas in contact with the gas mixture, the temperature of the gas mixture can be estimated in consideration of all the heat transfer which affects the temperature of the gas mixture during a period in which the gas mixture stagnates in a generally annular configuration in the vicinity of the side wall of the combustion chamber. Therefore, the gas mixture temperature can be estimated more accurately.

In this case, preferably, the quantity of heat transferred between the gas mixture and the wall of the combustion chamber is calculated on the basis of an area of contact and a thermal conductivity between the gas mixture and the wall of the combustion chamber; and the quantity of heat transferred between the gas mixture and the cylinder interior gas is calculated on the basis of an area of contact and a thermal conductivity between the gas mixture and the cylinder interior gas.

In general, the quantity of heat transferred between two objects which are in mutual contact can be calculated on the basis of an area of contract and a thermal conductivity between the objects, as well as a temperature difference therebetween. Accordingly, the above calculation enables easy and accurate calculation of the quantity of heat transfer which affects the temperature of the gas mixture during a period in which the gas mixture stagnates in a generally annular configuration in the vicinity of the side wall of the combustion chamber.

In the case where the thermal conductivity between the gas mixture and the wall of the combustion chamber and the thermal conductivity between the gas mixture and the cylinder interior gas are used in the calculation of the quantity of heat transferred between the gas mixture and the wall of the combustion chamber and in the calculation of the quantity of heat transferred between the gas mixture and the cylinder interior gas, respectively, preferably, the thermal conductivity between the gas mixture and the wall of the combustion chamber and the thermal conductivity between the gas mixture and the cylinder interior gas are individually changed in accordance with pressure of the cylinder interior gas.

In general, the thermal conductivity between a gas and an object in contact with the gas tends to increase with pressure of the gas, because the motion of molecules of the gas becomes active. Accordingly, the thermal conductivity between the gas mixture stagnating in a generally annular configuration in the vicinity of the side wall of the combustion chamber and an object in contact with the gas mixture tends to increase with the pressure of the gas mixture (accordingly, the pressure of the cylinder interior gas).

Therefore, in the case where the thermal conductivity between the gas mixture and the wall of the combustion chamber and the thermal conductivity between the gas mixture and the cylinder interior gas are individually changed in accordance with pressure of the cylinder interior gas, the two thermal conductivities can be increased with, for example, an increase in the pressure of the cylinder interior gas. As a result, it is possible to calculate more accurately the quantity of heat transfer which affects the temperature of the gas mixture during a period in which the gas mixture stagnates in a generally annular configuration in the vicinity of the side wall of the combustion chamber.

Moreover, preferably, the thermal conductivity between the gas mixture and the wall of the combustion chamber is changed in accordance with a value (e.g., engine speed) representing the speed of a flow of the gas mixture generated by a swirl. In general, the thermal conductivity between a gas and an object in contact with the gas tends to increase with relative speed at the contact surface between the gas and the object. Accordingly, the thermal conductivity between the gas mixture stagnating in a generally annular configuration in the vicinity of the side wall of the combustion chamber and the wall of the combustion chamber in contact with the gas mixture tends to increase with the speed of a circumferential flow of the cylinder interior gas (i.e., a circumferential flow of the gas mixture) generated by a swirl.

Therefore, in the case where the thermal conductivity between the gas mixture and the wall of the combustion chamber is changed in accordance with the value (e.g., engine speed) representing the speed of a circumferential flow of the gas mixture generated by a swirl (hereinafter referred to as "swirl speed") as described above, the thermal conductivity between the gas mixture and the wall of the combustion chamber can be increased with a change in the value representing the flow speed, to indicate an increased swirl speed. As a result, it is possible to calculate more accurately the quantity of heat transfer which affects the temperature of the gas mixture during a period in which the gas mixture stagnates in a generally annular configuration in the vicinity of the side wall of the combustion chamber.

Since the gas mixture stagnating in a generally annular configuration in the vicinity of the side wall of the combustion chamber is considered to rotate in the circumferential direction at an angular speed equal to that of the cylinder interior gas attributable to a swirl, the relative speed between the gas mixture and the cylinder interior gas as measured at the contact surface therebetween becomes substantially zero. Accordingly, the thermal conductivity between the gas mixture stagnating in a generally annular configuration in the vicinity of the side wall of the combustion chamber and the cylinder interior gas is not influenced by the swirl speed.

BEST MODE FOR CARRYING OUT THE INVENTION

With reference to the drawings, there will now be described an embodiment of an control apparatus of an internal combustion engine (diesel engine) which performs a gas mixture temperature estimation method for an internal combustion engine according to the present invention.

Figure 1:
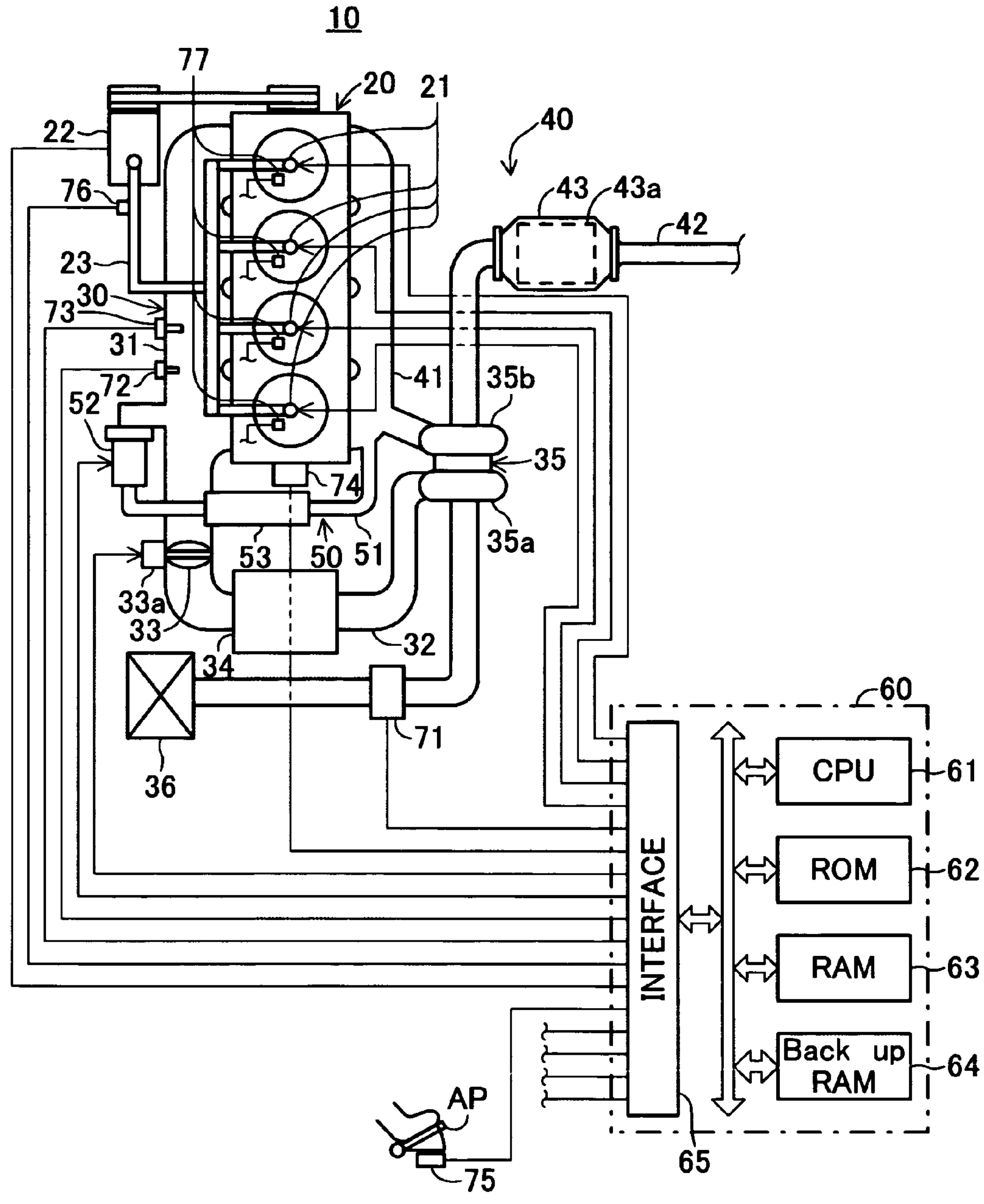
FIG. 1 a schematic diagram showing the overall configuration of a system in which a control apparatus according to an embodiment of the present invention is applied to a four-cylinder internal combustion engine (diesel engine), and the control apparatus performs a gas mixture temperature estimation method of the invention.

FIG. 1 schematically shows the entire configuration of a system in which the engine control apparatus according to the present invention is applied to a four-cylinder internal combustion engine (diesel engine) 10. This system comprises an engine main body 20 including a fuel supply system; an intake system 30 for introducing gas to combustion chambers (cylinder interiors) of individual cylinders of the engine main body 20; an exhaust system 40 for discharging exhaust gas from the engine main body 20; an EGR apparatus 50 for performing exhaust circulation; and an electronic control apparatus 60.

Fuel injection valves (injection valves, injectors) 21 are disposed above the individual cylinders of the engine main body 20. The fuel injection valves 21 are connected via a fuel line 23 to a fuel injection pump 22 connected to an unillustrated fuel tank. The fuel injection pump 22 is electrically connected to the electronic control apparatus 60. In accordance with a drive signal from the electronic control apparatus 60 (an instruction signal corresponding to an instruction final fuel injection pressure Pcrfin to be described later), the fuel injection pump 22 pressurizes fuel in such a manner that the actual injection pressure (discharge pressure) of fuel becomes equal to the instruction final fuel injection pressure Pcrfin.

Thus, fuel pressurized to the instruction final fuel injection pressure Pcrfin is supplied from the fuel injection pump 22 to the fuel injection valves 21. Moreover, the fuel injection valves 21 are electrically connected to the electronic control apparatus 60. In accordance with a drive signal (an instruction signal corresponding to an instruction fuel injection quantity qfin) from the electronic control apparatus 60, each of the fuel injection valves 21 opens for a predetermined period of time so as to inject, directly to the combustion chamber of the corresponding cylinder, the fuel pressurized to the instruction final fuel injection pressure Pcrfin, in the instruction fuel injection quantity qfin.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; a throttle valve actuator 33*a* for rotating the throttle valve 33 in accordance with a drive signal from the electronic control apparatus 60; an intercooler 34, which is interposed in the intake pipe 32 to be located on the upstream side of the throttle valve 33; a compressor 35*a* of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35*b* of the turbocharger 35 interposed in the exhaust pipe 42; and a diesel particulate filter (hereinafter referred to as "DPNR") 43, which is interposed in the exhaust pipe 42. The exhaust manifold 41 and the exhaust pipe 42 constitute an exhaust passage.

The DPNR 43 is a filter unit which accommodates a filter 43*a* formed of a porous material such as cordierite and which collects, by means of a porous surface, the particulate matter contained in exhaust gas passing through the filter. In the DPNR 43, at least one metal element selected from alkaline metals such as potassium K, sodium Na, lithium Li, and cesium Cs; alkaline-earth metals such as barium Ba and calcium Ca; and rare-earth metals such as lanthanum La and yttrium Y is carried, together with platinum, on alumina serving as a carrier. Thus, the DPNR 43 also serves as a storage-reduction-type $NO_x$ catalyst unit which, after absorption of $NO_x$, releases the absorbed $NO_x$ and reduces it.

The EGR apparatus 50 includes an exhaust circulation pipe 51, which forms a passage (EGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35*b*, and an intake passage (the intake manifold 31) located on the downstream side of the throttle valve 33. The EGR control valve 52 responds to a drive signal from the electronic control apparatus 60 so as to change the quantity of exhaust gas to be circulated (exhaust-gas circulation quantity, EGR-gas flow rate).

The electronic control apparatus 60 is a microcomputer which includes a CPU 61, ROM 62, RAM 63, backup RAM 64, an interface 65, etc., which are connected to one another by means of a bus. The ROM 62 stores a program to be executed by the CPU 61, tables (lookup tables, maps), constants, etc. The RAM 63 allows the CPU 61 to temporarily store data. The backup RAM 64 stores data in a state in which the power supply is on, and holds the stored data even after the power supply is shut off. The interface 65 contains A/D converters.

The interface 65 is connected to a hot-wire-type air flow meter 71, which serves as air flow rate (new-air flow rate) measurement means, and is disposed in the intake pipe 32; an intake temperature sensor 72, which is provided in the intake passage to be located downstream of the throttle valve 33 and downstream of a point where the exhaust circulation pipe 51 is connected to the intake passage; an intake pipe pressure sensor 73, which is provided in the intake passage to be located downstream of the throttle valve 33 and downstream of a point where the exhaust circulation pipe 51 is connected to the intake passage; a crank position sensor 74; an accelerator opening sensor 75; a fuel temperature sensor 76 provided in the fuel pipe 23 in the vicinity of the discharge port of the fuel injection pump 22; and a cylinder interior pressure sensor 77 disposed for each cylinder. The interface 65 receives respective signals from these sensors, and supplies the received signals to the CPU 61. Further, the interface 65 is connected to the fuel injection valves 21, the fuel injection pump 22, the throttle valve actuator 33*a*, and the EGR control valve 52; and outputs corresponding drive signals to these components in accordance with instructions from the CPU 61.

The hot-wire-type air flow meter 71 measures the mass flow rate of intake air passing through the intake passage (intake air quantity per unit time, new air quantity per unit time), and generates a signal indicating the mass flow rate Ga (air flow rate Ga). The intake temperature sensor 72 measures the temperature of gas that is taken into each cylinder (i.e., each combustion chamber or cylinder interior) of the engine 10 (i.e., intake temperature), and generates a signal representing the intake temperature Tb. The intake pipe pressure sensor 73 measures the pressure of gas that is taken into each cylinder of the engine 10 (i.e., intake pipe pressure), and generates a signal representing the intake pipe pressure Pb.

The crank position sensor 74 detects the absolute crank angle of each cylinder, and generates a signal representing the crank angle CA and engine speed NE; i.e., rotational speed of the engine 10. The accelerator opening sensor 75 detects an amount by which an accelerator pedal AP is operated, and generates a signal representing the accelerator pedal operated amount Acc. The fuel temperature sensor 76 detects temperature of fuel flowing through the fuel line 23, and generates a signal representing fuel temperature Tcr. The cylinder interior pressure sensor 77 detects pressure of a gas within the combustion chamber (i.e., pressure of the cylinder interior gas), and generates a signal representing the cylinder interior gas pressure Pa. As will be described later, the cylinder interior pressure sensor 77 is used only for detection of ignition timing.

Outline of Method for Estimating Gas Mixture Temperature

Figure 2:
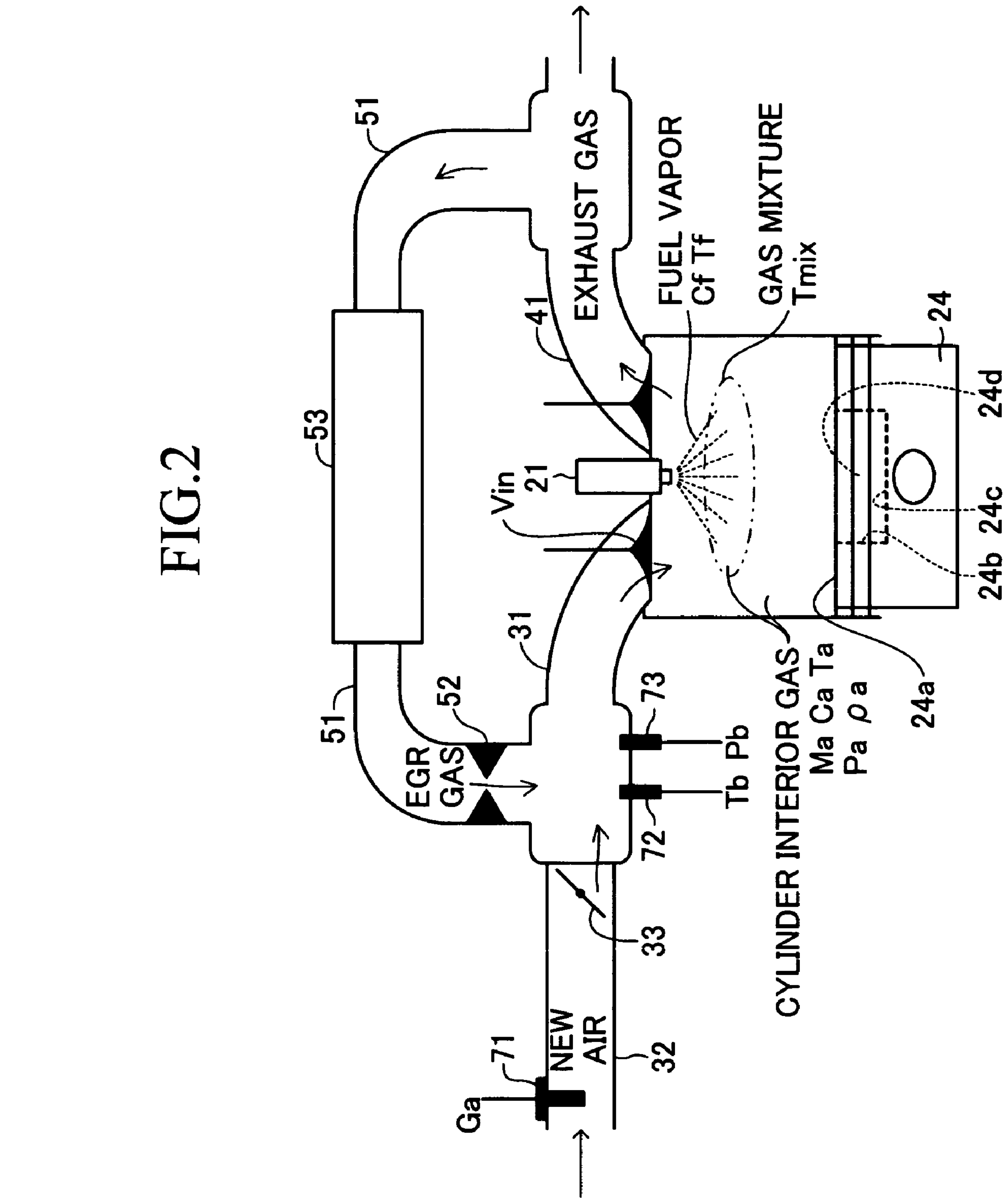
FIG. 2 is a diagram schematically showing a state in which gas is taken from an intake manifold to a certain cylinder and is then discharged to an exhaust manifold.

Next, there will be described a method for estimating gas mixture temperature performed by the control apparatus of the internal combustion engine having the above-described configuration (hereinafter may be referred to as the "present apparatus"). FIG. 2 is a diagram schematically showing a state in which gas is taken from the intake manifold 31 into a certain cylinder (combustion chamber) and is then discharged to the exhaust manifold 41.

Figure 4A:
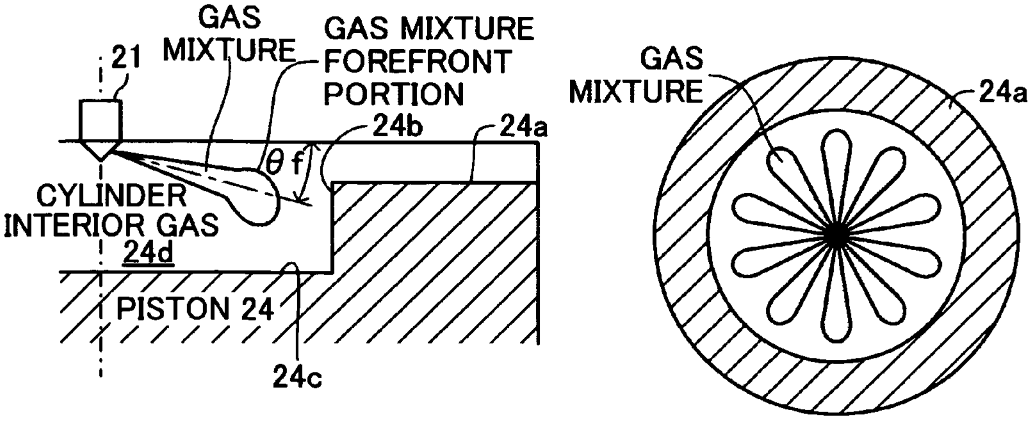
FIG. 4A is a diagram schematically showing a state in which a gas mixture disperses before injected fuel (i.e., a forefront portion of the gas mixture) reaches the inner wall surface of a combustion chamber.

As shown in FIG. 2, the combustion chamber is defined by a cylinder head, a cylindrical inner wall surface of the cylinder, and a piston 24. A cylindrical depression (hereinafter referred to as a "cavity 24*d*") is formed on the top surface 24*a* of the piston 24 concentrically with the center axis thereof. The fuel injection valve 21 is fixedly disposed on the cylinder head in such a manner that the center axis of the fuel injection valve 21 coincides with the center axis of the cylinder, and 10 injection openings are provided at the tip end of the fuel injection valve 21 so as to cause the injected fuel (i.e., gas mixture) to disperse toward the side wall 24*b* of the cavity 24*d* along ten directions which are disposed at uniform angular intervals and extend along an imaginary cone centered at the center axis of the cylinder, as shown in FIG. 4A to be described later.

As shown in FIG. 2, the gas taken into the combustion chamber (accordingly, cylinder interior gas) includes new air taken from the tip end of the intake pipe 32 via the throttle valve 33, and EGR gas taken from the exhaust circulation pipe 51 via the EGR control valve 52. The ratio (i.e., EGR ratio) of the quantity (mass) of the taken EGR gas to the sum of the quantity (mass) of the taken new air and the quantity (mass) of the taken EGR gas changes depending on the opening of the throttle valve 33 and the opening of the EGR control valve 52, which are properly controlled by the electronic control apparatus 60 (CPU 61) in accordance with the operating condition.

During an intake stroke, such new air and EGR gas are taken into the cylinder via an opened intake valve Vin as the piston moves downward, and the thus-produced gas mixture serves as cylinder interior gas. The cylinder interior gas is confined within the cylinder when the intake valve Vin closes upon the piston having reached bottom dead center, and is then compressed in a subsequent compression stroke as the piston moves upward. When the piston reaches top dead center (specifically, when a final fuel injection timing finjfin to be described later comes), the present apparatus opens the corresponding fuel injection valve 21 for a predetermined period of time corresponding to the instruction fuel injection quantity qfin, to thereby inject fuel directly into the cylinder. As a result, the (liquid) fuel injected from each injection opening immediately becomes fuel vapor, because of heat received from the cylinder interior gas having become hot due to compression. With elapse of time, the fuel vapor disperses conically, while mixing with the cylinder interior gas to produce a gas mixture.

Figure 3:
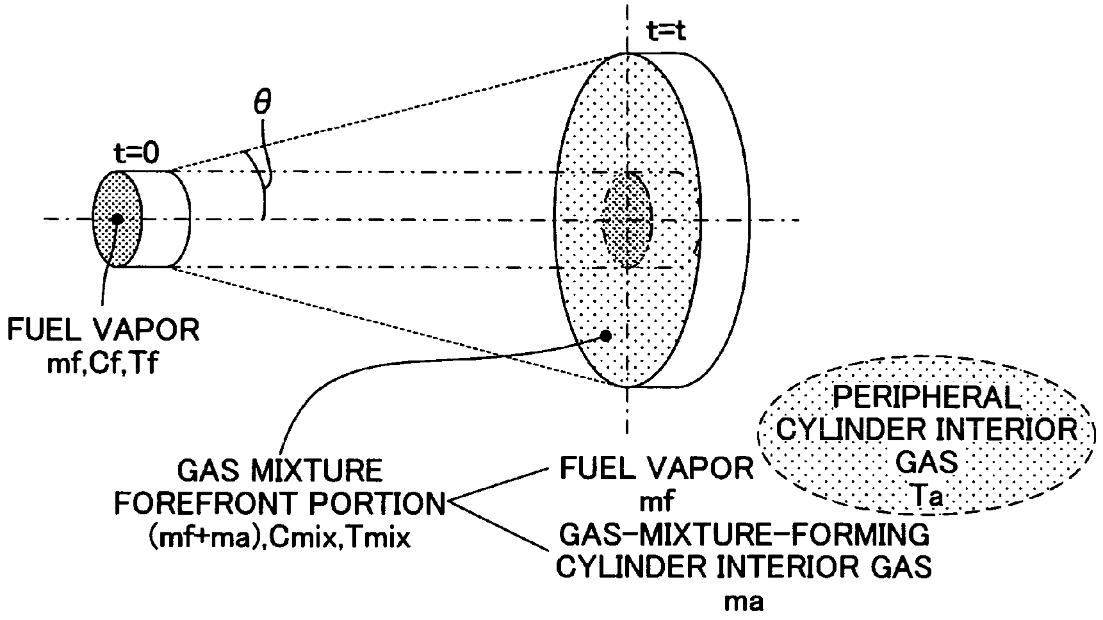
FIG. 3 is a diagram schematically showing a state in which fuel vapor disperses conically while mixing with cylinder interior gas to thereby produce a gas mixture.

FIG. 3 is a diagram schematically showing a state in which fuel vapor produced upon injection of fuel from a certain injection opening disperses conically while mixing with cylinder interior gas to produce a gas mixture. Now, of fuel continuously injected for the predetermined period of time, fuel (fuel vapor) which is present in a forefront portion and has a mass of mf will be considered. After being injected at a fuel injection start time (i.e., post injection time t=0), the fuel vapor whose mass is mf conically disperses at a spray angle θ (see FIG. 3). The fuel vapor is assumed to mix with a cylinder interior gas (hereinafter may be referred to as "gas-mixture-forming cylinder interior gas") which has a mass of ma and is a portion of the cylinder interior gas, at arbitrary post injection time t, to thereby produce a gas mixture forefront portion (a columnar portion having a circumferential surface A) which has a mass of (mf+ma). The present apparatus estimates temperature of the gas mixture forefront portion as measured at arbitrary post injection time t (the gas mixture temperature Tmix, which will be described later). First, there will be described a method of obtaining the mass ma of the gas-mixture-forming cylinder interior gas which mixes with the fuel vapor having the mass mf (the ratio (mass ratio) of the mass ma of the gas-mixture-forming cylinder interior gas to the mass mf of the fuel vapor) at arbitrary post injection time t.

<Obtainment of Mass ma of Gas-Mixture-Forming Cylinder Interior Gas>

In order to obtain the mass ma of the gas-mixture-forming cylinder interior gas as measured at post injection time t, the ratio of the mass ma of the gas-mixture-forming cylinder interior gas to the mass mf of the fuel vapor (i.e., ma/mf) at post injection time t is obtained. Now, an excess air factor λ of the gas mixture forefront portion at post injection time t is defined by the following Equation (1). In Equation (1), stoich represents a stoichiometric air-fuel ratio (e.g., 14.6).

$$\lambda=(ma/mf)/\text{stoich} \qquad (1)$$

The excess air factor λ defined as described above can be obtained as a function of post injection time t on the basis of, for example, the following Equation (2) and Equation (3), which are empirical formulas introduced in "Study on Injected Fuel Travel Distance in Diesel Engine," Yutaro WAGURI, Masaru FUJII, Tatsuo AMIYA, and Reijiro TSUNEYA, the Transactions of the Japanese Society of Mechanical Engineers, p 820, 25-156 (1959) (hereinafter referred to as Non-Patent Document 1).

$$\lambda=\int\frac{d\lambda}{dt}dt \qquad (2)$$

$$\frac{d\lambda}{dt}=\frac{2^{0.25}}{c^{0.25}\cdot d^{0.5}\cdot\rho_f}\cdot\frac{1}{L}\cdot\tan^{0.5}\theta\cdot\rho_a^{0.25}\cdot\Delta P^{0.25}\cdot\frac{1}{t^{0.5}} \qquad (3)$$

In Equation (3), t represents the above-mentioned post injection time, and dλ/dt represents fuel dilution ratio, which is a function of post injection time t. Further, c represents a contraction coefficient, d represents the diameter of the injection openings of the fuel injection valves 21, ρf represents the density of (liquid) fuel, and L represents a theoretical dilution gas quantity, all of which are constants.

In Equation (3), ΔP represents effective injection pressure, which is a value obtained through subtraction, from the above-mentioned final fuel injection pressure Pcrfin, of cylinder interior gas pressure Pa0 at the injection start time (i.e., post injection time t=0). The cylinder interior gas pressure Pa0 can be obtained in accordance with the following Equation (4) under the assumption that the state of the cylinder interior gas changes adiabatically in the compression stroke (and expansion stroke) after the piston has reached bottom dead center (hereinafter referred to as "ATDC-180°", the point in time at which the cylinder interior gas has been confined).

$$Pa0=P\text{bottom}\cdot(V\text{bottom}/Va0)^{\kappa} \qquad (4)$$

In Equation (4), Pbottom represents cylinder interior gas pressure at ATDC-180°. Since the cylinder interior gas pressure is considered to be substantially equal to the intake pipe pressure Pb at ATDC-180°, the value of Pbottom can obtained from the intake pipe pressure Pb detected by means of the intake pipe pressure sensor 73 at ATDC-180°. Vbottom represents cylinder interior volume at ATDC-180°. Va0 represents cylinder interior volume corresponding to a crank angle CA at post injection time t=0. Since cylinder interior volume Va can be obtained as a function Va(CA) of the crank angle CA on the basis of the design specifications of the engine 10, the values of Vbottom and Va0 can be obtained as well. κ represents the specific heat ratio of the cylinder interior gas.

In Equation (3), θ represents the spray angle shown in FIG. 3. Since the spray angle θ is considered to change in accordance with the above-mentioned effective injection pressure ΔP and density ρa0 of the cylinder interior gas at the injection start time (i.e., post injection time t=0), the spray angle θ can be obtained on the basis of a table Mapθ, which defines the relation between cylinder interior gas density ρa0, effective injection pressure ΔP, and spray angle θ. The cylinder interior gas density ρa0 can be obtained through division of the total mass Ma of the cylinder interior gas by the above-mentioned cylinder interior volume Va0 at post injection time t=0. The total mass Ma of the cylinder interior gas can be obtained in accordance with the following Equation (5), which is based on the state equation of gas at ATDC-180°. In Equation (5), Tbottom represents cylinder interior gas temperature at ATDC-180°. Since the cylinder interior gas temperature is considered to be substantially equal to the intake temperature Tb at ATDC-180°, the value of Tbottom can be obtained from the intake temperature Tb detected by means of the intake temperature sensor 72 at ATDC-180°. Ra represents the gas constant of the cylinder interior gas.

$$Ma=P\text{bottom}\cdot V\text{bottom}/(Ra\cdot T\text{bottom}) \qquad (5)$$

In Equation (3), ρa represents density of the cylinder interior gas at post injection time t and can be obtained as a function of post injection time t through division of the total mass Ma of the cylinder interior gas by the above-mentioned cylinder interior volume Va(CA) at post injection time t.

As described above, the effective injection pressure ΔP and the spray angle θ are first obtained at post injection time t=0; and subsequently, values of the fuel dilution ratio dλ/dt are successively obtained in accordance with Equation (3) and on the basis of post injection time t and cylinder interior gas density ρa, which is a function of post injection time t. The successively obtained values of fuel dilution ratio dλ/dt are integrated with respect to time in accordance with Equation (2), whereby excess air factor λ at post injection time t can be obtained. Upon obtainment of excess air factor λ at post injection time t, mass ratio ma/mf at post injection time t can be obtained from Equation (1).

Since the fuel dilution ratio dλ/dt obtained from Equation (3) always assumes a positive value, the excess air factor λ obtained from Equation (2) increases with the post injection time t. Therefore, as can be understood from Equation (1), the mass ratio (ma/mf) increases with the post injection time t. This coincides with the fact that as vapor of the injected fuel (its forefront portion) disperses conically, an increasing quantity of the cylinder interior gas (i.e., gas-mixture-forming cylinder interior gas) is mixed with the fuel vapor at the gas mixture forefront portion.

<Obtainment of Adiabatic Gas Mixture Temperature Tmix>

Upon obtainment of the mass ratio ma/mf at post injection time t, the gas mixture temperature Tmix (=Tmix(k)) of the gas mixture forefront portion can be obtained at intervals corresponding to the computation cycle of the CPU 61 as described below. This gas mixture temperature Tmix(k) represents the temperature of the gas mixture forefront portion (gas mixture temperature) calculated under the assumption that heat exchange with the outside (i.e., a cylinder interior gas which exists around the gas mixture without mixing with the fuel (hereinafter referred to as "peripheral cylinder interior gas")) does not occur in the course of mixture of the fuel vapor having a mass of mf and constituting the gas mixture forefront portion and the mixing-gas-forming cylinder interior gas having a mass of ma. Notably, the suffix (k) appended to Tmix represents that the value of Tmix is a value calculated in the current computation cycle (current value). In the following description, the same rule applies to variables other than Tmix; i.e., suffix (k) represents that the value of a variable to which the suffix (k) is appended is a current value, and suffix (k−1) represents that the value of a variable to which the suffix (k−1) is appended is a value calculated in the previous computation cycle (previous value).

Now, a gas mixture in the previous computation cycle, which has a mass ratio (previous value) (ma/mf)(k−1), a mass (mf+ma), and a gas mixture temperature (previous value) Tmix(k−1), is considered. The quantity of heat carried by the gas mixture can be represented by "(mf+ma)·Cmix(k−1)·Tmix(k−1)" by use of the specific heat Cmix(k−1) of the gas mixture and the gas mixture temperature Tmix(k−1). The specific heat Cmix(k−1) of the gas mixture can be represented by Equation (6) shown below. In Equation (6), Cf represents the specific heat of fuel vapor, and Ca represents the specific heat of the cylinder interior gas.

$$Cmix(k-1)=(Cf+(ma/mf)(k-1)\cdot Ca)/(1+(ma/mf)(k-1)) \tag{6}$$

Meanwhile, when the mass of a gas-mixture-forming cylinder interior gas which is newly-added as a gas mixture during a period between the previous computation time and the current computation time is represented by Δma, the quantity of heat carried by the gas-mixture-forming cylinder interior gas of the mass Δma can be represented by "Δma·Ca·Ta," where Ca represents the specific heat of the cylinder interior gas, and Ta represents the temperature of the cylinder interior gas (at the current computation time). The temperature Ta of the cylinder interior gas (i.e., the temperatures of the mixing-gas-forming cylinder interior gas and the peripheral cylinder interior gas) can be obtained in accordance with the following Equation (7) under the assumption that the state of the cylinder interior gas changes adiabatically in the compression stroke (and the expansion stroke).

$$Ta=Tbottom\cdot(Vbottom/Va(CA))^{\kappa-1} \tag{7}$$

Under the assumption that the entire heat quantity discharged from the mixing-gas-forming cylinder interior gas (mass: Δma) when the temperature Ta of the mixing-gas-forming cylinder interior gas decreases to the gas mixture temperature (current value) Tmix(k) is absorbed by the gas mixture (mass: mf+ma) so as to increase the gas mixture temperature (previous value) Tmix(k−1) to the gas mixture temperature (current value) Tmix(k), the following Equation (8) stands. When Equation (8) is solved for the gas mixture temperature (current value) Tmix(k), and rearranged, the following Equation (9) is obtained.

$$\Delta ma\cdot Ca\cdot(Ta-Tmix(k))=(mf+ma)\cdot Cmix(k-1)\cdot(Tmix(k)-Tmix(k-1)) \tag{8}$$

$$Tmix(k)=(Cmix(k-1)\cdot Tmix(k-1)+A\cdot Ca\cdot Ta)/(Cmix(k-1)+A\cdot Ca) \tag{9}$$

In Equation (9), A represents the value of Δma/(mf+ma). Here, since Δma/mf=(ma/mf)(k)−(ma/mf)(k−1), the following Equation (10) can be obtained for the value A. Accordingly, the value A can be obtained in accordance with Equation (10) by use of the mass ratio previous value (ma/mf)(k−1) and the mass ratio current value (ma/mf)(k).

$$A=((ma/mf)(k)-(ma/mf)(k-1))/(1+(ma/mf)(k-1)) \tag{10}$$

Accordingly, when the initial values of the gas mixture temperature Tmix, the gas mixture specific heat Cmix, and the mass ratio ma/mf. (i.e., the values at a point in time where post injection time t=0) are given, the gas mixture temperature Tmix(k) after the point in time where the post injection time t=0 can be successively obtained in accordance with the above-described Equation (9) at the computation intervals. Notably, the initial values of the gas mixture temperature Tmix, the gas mixture specific heat Cmix, and the mass ratio ma/mf are the temperature Tf of fuel vapor, the specific heat Cf of fuel vapor, and zero, respectively.

The temperature Tf of the fuel vapor can be expressed by the following Equation (11) in consideration of latent heat Qvapor per unit mass generated when the liquid fuel changes to fuel vapor immediately after injection. In Expression (11), Tcr represents the temperature of liquid fuel detected by means of the fuel temperature sensor 76 at post injection time t=0. αcr is a correction coefficient for taking into consideration a heat loss produced when fuel passes through the fuel pipe 23 from the vicinity of the discharge port of the fuel injection pump 22 to the fuel injection valves 21.

$$Tf=\alpha cr\cdot Tcr-Qvapor/Cf \tag{11}$$

<Treatment After Gas Mixture Forefront Portion Collides Against Inner Wall Surface of Combustion Chamber>

As described previously, the fuel injected from the fuel injection valve 21 (accordingly, the gas mixture forefront portion) moves toward the side surface **24*b* of the cavity 24*d* as shown in FIG. 4A. When a predetermined time elapses after the start of the injection, the gas mixture forefront portion reaches the side surface 24*b*** (the inner wall surface of the combustion chamber).

Figure 4B:
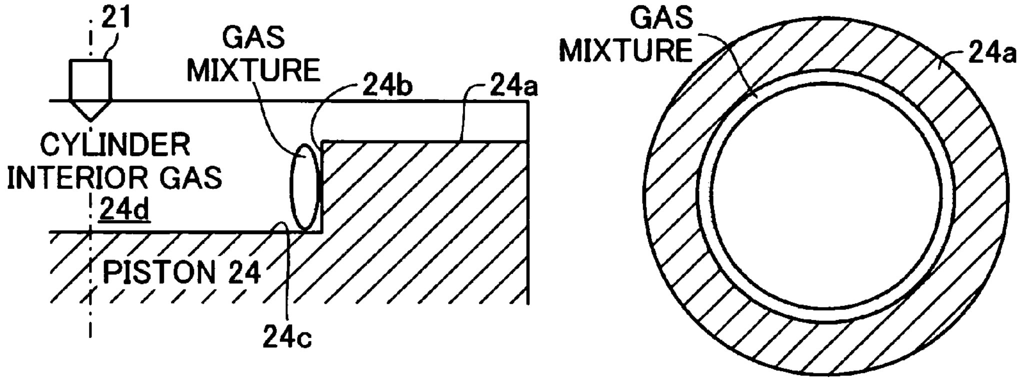
FIG. 4B is a diagram schematically showing a state in which the gas mixture is stagnating in an annular configuration in the vicinity of the side wall of the combustion chamber after the forefront portion of the gas mixture has reached the inner wall surface of the combustion chamber.

After the gas mixture forefront portion reaches the side surface **24*b*, the gas mixture (the entirety thereof) is considered to stagnate in a generally annular configuration in the vicinity of the side surface 24*b* (the side wall of the combustion chamber) as shown in FIG. 4B, because the gas mixture loses momentum through collision against the side surface 24*b*. During a period in which the gas mixture (the entirety thereof) is stagnating, the gas mixture can transfer (exchange) heat with the cylinder interior gas and the wall of the cavity 24*d* (the side wall constituting the side surface 24*b*, the bottom wall constituting the bottom surface 24*c***, and the wall of the combustion chamber), which are present around the gas mixture and are in contact with the gas mixture.

Meanwhile, the gas mixture temperature Tmix(k) calculated in accordance with Equation (9) is the temperature of the gas mixture calculated under the assumption that no heat is exchanged between the gas mixture and the outside. Accordingly, after the gas mixture forefront portion reaches the side surface 24*b*, the temperature of the gas mixture assumes a value which deviates from the gas mixture temperature Tmix (k) calculated in accordance with Equation (9) by a temperature (hereinafter referred to as "temperature drop ΔT") corresponding to heat transfer effected between the gas mixture and the cylinder interior gas and the wall of the cavity 24*d*.

As is apparent from the above, in order to accurately obtain the temperature of the gas mixture even after the gas mixture forefront portion reaches the side surface 24*b* (i.e., during a period in which the entire gas mixture is stagnant in a generally annular configuration near the side surface 24*b*), the traveling distance of the mixture forefront portion after the start of the injection as measured from the injection opening of the fuel injection valve 21, the distance between the injection opening and the side surface 24*b* of the cavity 24*d*, and the quantity of heat transferred between the gas mixture and the cylinder interior gas and the wall of the cavity 24*d* must be obtained. Methods for obtaining these values will now be described successively.

The traveling distance over which the gas mixture forefront portion travels from the injection opening of the fuel injection valve 21 after the injection start time (hereinafter referred to as "gas mixture travel distance X") can be obtained as a function of post injection time t on the basis of; for example, the following Equation (12) and Equation (13), which are experimental formulas introduced in the above-mentioned Non-Patent Document 1. In Equation (13), dX/dt represents gas mixture moving speed, which is a function of post injection time t. Notably, various values shown in the right side of Equation (13) are identical with those shown in the right side of Equation (3).

$$X = \int \frac{dX}{dt} dt \tag{12}$$

$$\frac{dX}{dt} = \frac{1}{2} \cdot \left( \frac{2c \cdot \Delta P}{\rho_a} \right)^{0.25} \cdot \left( \frac{d}{\tan\theta} \right)^{0.5} \cdot \frac{1}{t^{0.5}} \tag{13}$$

That is, values of the gas mixture moving speed dX/dt are successively obtained in accordance with Equation (13) and on the basis of post injection time t and cylinder interior gas density ρa, which is a function of post injection time t. The successively obtained values of the gas mixture moving speed dX/dt are integrated with respect to time in accordance with Equation (12), whereby the gas mixture travel distance X at post injection time t can be obtained.

The distance from the injection opening of the fuel injection valve 21 to the side surface 24*b* of the cavity 24*d* (hereinafter referred to as "combustion chamber inner wall surface distance Xwall") can be represented by the following Equation (14) by use of the radius a of the cavity 24*d* and the injection angle θf (see FIG. 4A).

$$X\text{wall} = a/\cos(\theta f) \tag{14}$$

Figure 5:
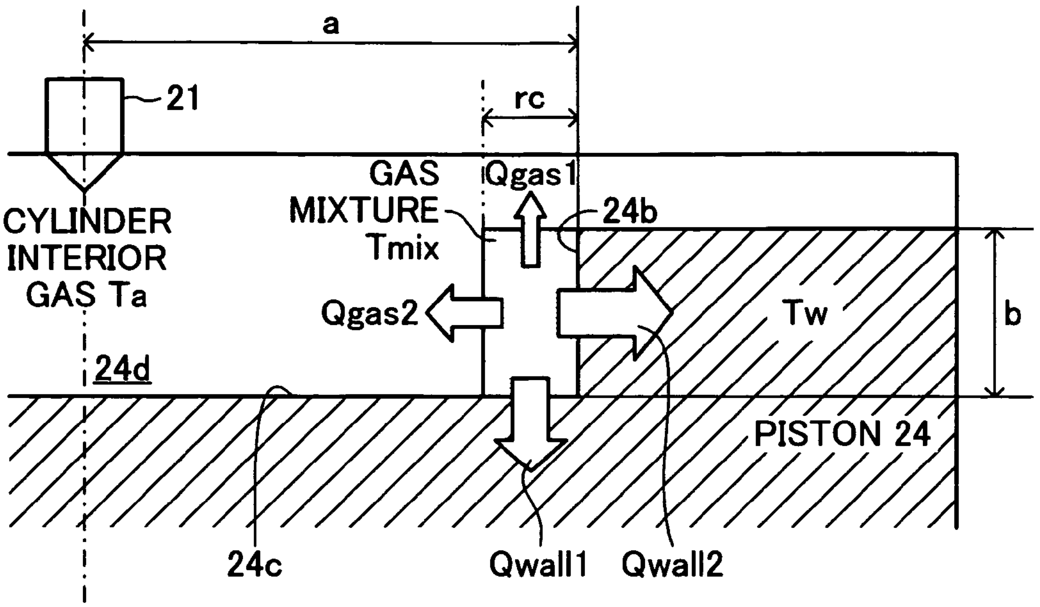
FIG. 5 is a diagram showing a model regarding a gas mixture stagnating in an annular configuration in the vicinity of the side wall of the combustion chamber, the model being used for obtaining the quantity of heat transfer between the gas mixture and the cylinder interior gas and that between the gas mixture and the wall of the combustion chamber.
Figure 6:
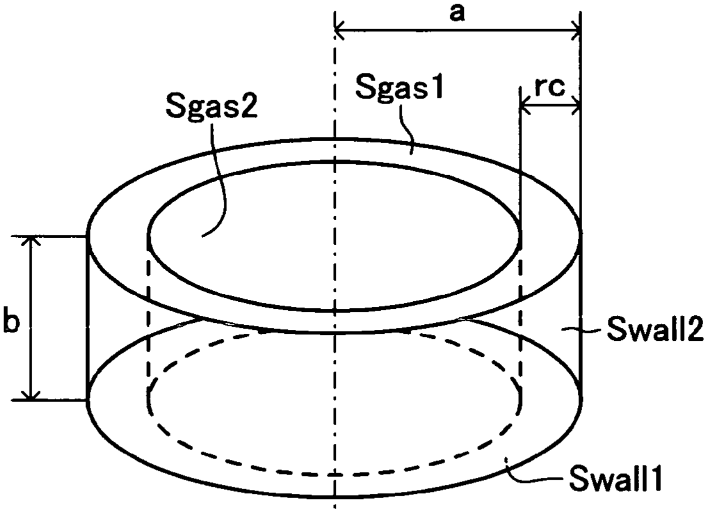
FIG. 6 is a perspective view showing the shape of the gas mixture stagnating in the annular configuration according to the model of FIG. 5.

Next, there will be described a method for obtaining the quantity of heat transferred between the gas mixture stagnating in an annular configuration and the cylinder interior gas and the quantity of heat transferred between the gas mixture and the wall of the cavity 24*d*. In the present example, a model as shown in FIG. 5 will be considered for the gas mixture stagnating in an annular configuration. In this model, the stagnating gas mixture is assumed to form a ring shape which has a rectangular cross section and has a thickness (gas mixture thickness) rc and a height equal to the cavity depth b, as shown in FIG. 6, and to be surrounded by the side surface 24*b* and the bottom surface 24*c* of the cavity 24*d*, and the cylinder interior gas.

In this case, heat quantity Qgas1, which is the quantity of heat transferred from the top surface of the gas mixture to the cylinder interior gas, heat quantity Qgas2, which is the quantity of heat transferred from the inner side surface of the gas mixture to the cylinder interior gas, heat quantity Qwall1, which is the quantity of heat transferred from the bottom surface of the gas mixture to the cavity bottom surface 24*c*, and heat quantity Qwall2, which is the quantity of heat transferred from the outer side surface of the gas mixture to the cavity side surface 24*b*, can be represented by the following Equations (15) to (18), respectively, The heat quantities Qgas1, Qgas2, Qwall1, and Qwall2 each represent a heat quantity transferred within a single computation cycle.

$$Q\text{gas1} = S\text{gas1} \cdot \alpha\text{gas} \cdot (T\text{mix}(k) - Ta) \tag{15}$$

$$Q\text{gas2} = S\text{gas2} \cdot \alpha\text{gas} \cdot (T\text{mix}(k) - Ta) \tag{16}$$

$$Q\text{wall1} = S\text{wall1} \cdot \alpha\text{wall} \cdot (T\text{mix}(k) - Tw) \tag{17}$$

$$Q\text{wall2} = S\text{wall2} \cdot \alpha\text{wall} \cdot (T\text{mix}(k) - Tw) \tag{18}$$

In Equations (15) and (16), αgas represents the thermal conductivity between the gas mixture and the cylinder interior gas, and Ta represents the cylinder interior gas temperature calculated by the above-described Equation (7). In Equations (17) and (18), αwall represents the thermal conductivity between the gas mixture and the wall of the cavity 24*d*, and Tw represents the temperature of the wall of the cavity 24*d* (cavity wall surface temperature). Since the cavity wall surface temperature Tw is considered to change in accordance with the instruction fuel injection quantity qfin and the engine speed NE, the cavity wall surface temperature Tw can be represented by a function funcTw(qfin, NE) whose arguments are the instruction fuel injection quantity qfin and the engine speed NE. Further, in Equations (15) to (18), Tmix(k) represents the gas mixture temperature calculated by the above-described Equation (9).

In Equations (15) to (18), Sgas1, Sgas2, Swall1, and Swall2 represent the top-surface contract area between the gas mixture and the cylinder interior gas, the side-surface contract area between the gas mixture and the cylinder interior gas, the bottom-surface contract area between the gas mixture and the cavity bottom surface 24*c*, and the side-surface contract area between the gas mixture and the cavity side surface 24*b*, respectively. As is easily understood from FIG. 6, these areas can be represented by the following Equations (19) to (22).

$$S\text{gas1} = \pi \cdot (a^2 - (a - rc)^2) = \pi \cdot rc \cdot (2a - rc) \tag{19}$$

$$S\text{gas2} = 2\pi \cdot (a - rc) \cdot b \tag{20}$$

$$S\text{wall1} = \pi \cdot (a^2 - (a - rc)^2) = \pi \cdot rc \cdot (2a - rc) \tag{21}$$

$$S\text{wall2} = 2\pi \cdot a \cdot b \tag{22}$$

In Equations (19) to (21), the gas mixture thickness rc is considered to increase with the instruction fuel injection quantity qfin; the gas mixture thickness rc can be obtained in accordance with the following Equation (23). In Equation (23), C2 represents a proportionality constant.

$$rc=C2\cdot q\text{fin} \quad (23)$$

Figure 7A:
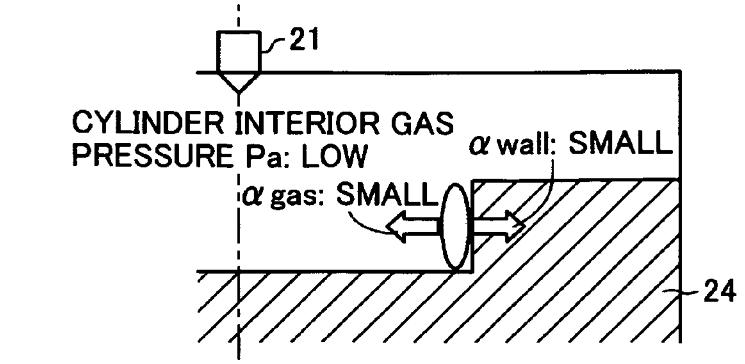
FIGS. 7A and 7B are diagrams showing the relation between the pressure of the cylinder interior gas, and the thermal conductivity between the gas mixture stagnating in an annular configuration and the cylinder interior gas and that between the gas mixture and the wall of the combustion chamber.
Figure 7B:
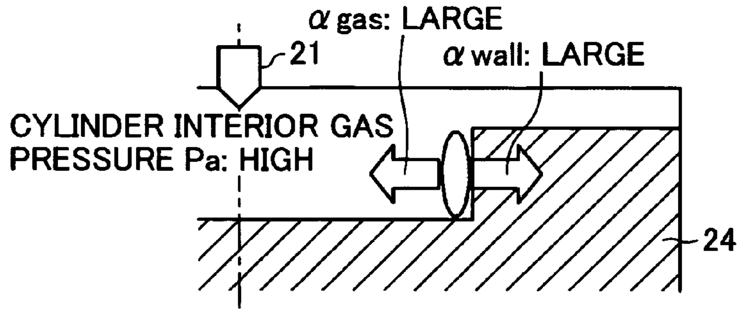
Figures 8A, 8B:
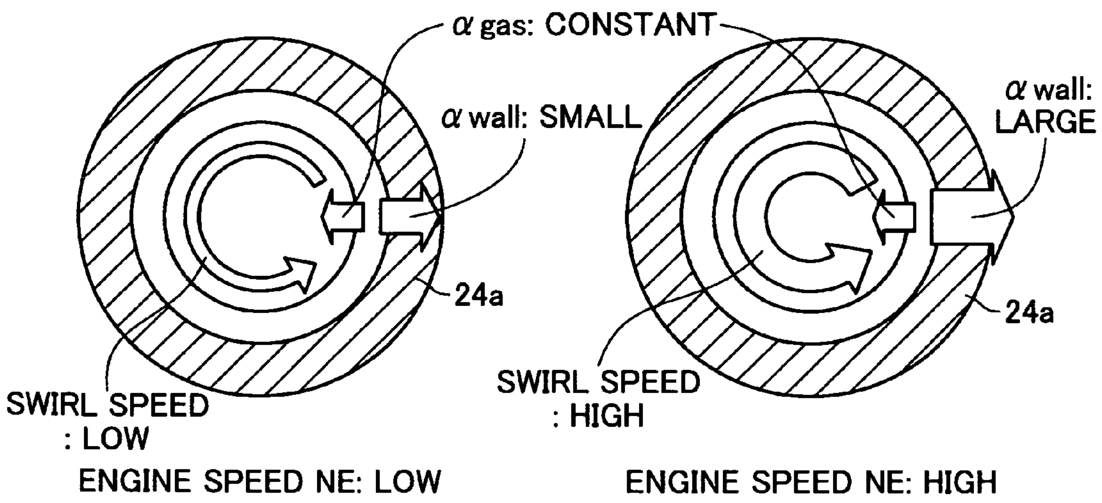
FIGS. 8A and 8B are diagrams showing the relation between the swirl speed, and the thermal conductivity between the gas mixture stagnating in an annular configuration and the cylinder interior gas and that between the gas mixture and the wall of the combustion chamber.

As shown in FIG. 7, the thermal conductivities αgas and αwall increase with the pressure of the gas mixture (i.e., the cylinder interior gas pressure Pa) because the degree of activeness of motion of gas molecules increases. That is, the thermal conductivities αgas and αwall assume values corresponding to the cylinder interior gas pressure Pa. Further, as shown in FIGS. 8A and 8B, the thermal conductivity αwall increases with the relative speed at the contact surface between the gas mixture and the wall of the cavity 24*d* (i.e., swirl speed). When the swirl ratio is assumed to be constant, the swirl speed assumes a value corresponding to the engine speed NE, and thus, the thermal conductivity αwall assumes a value corresponding to the engine speed NE. Accordingly, the thermal conductivity αgas can be represented by a function funcαgas(Pa) whose argument is the cylinder interior gas pressure Pa, and the thermal conductivity αwall can be represented by a function funcαwall(Pa, NE) whose arguments are the cylinder interior gas pressure Pa and the engine speed NE. The cylinder interior gas pressure Pa can be obtained in accordance with the following Equation (24), which is similar to the above-described Equation (4).

$$Pa=P\text{bottom}\cdot(V\text{bottom}/Va(CA))^{\kappa} \quad (24)$$

Since all the variables used in the above-described Equations (15) to (18) are obtained through the above calculation, the heat quantities Qgas1, Qgas2, Qwall1, and Qwall2 can be obtained in accordance with Equations (15) to (18). As a result, heat transfer quantity Qgas, which is the (total) quantity of heat transferred between the gas mixture stagnating in an annular configuration and the cylinder interior gas within each computation cycle, and heat transfer quantity Qwall, which is the (total) quantity of heat transferred between the gas mixture and the wall of the cavity 24*d* within each computation cycle, can be obtained in accordance with the following Equations (25) and (26). In Equation (25), Sgas represents a total area of contact between the gas mixture and the cylinder interior gas, and is the sum of Sgas1 and Sgas2. In Equation (26), Swall represents a total area of contact between the gas mixture and the wall of the cavity 24*d*, and is the sum of Swall1 and Swall2.

$$Q\text{gas}=Q\text{gas}1+Q\text{gas}2=S\text{gas}\cdot\alpha\text{gas}\cdot(T\text{mix}(k)-Ta) \quad (25)$$

$$Q\text{wall}=Q\text{wall}1+Q\text{wall}2=S\text{wall}\cdot\alpha\text{wall}\cdot(T\text{mix}(k)-Tw) \quad (26)$$

Meanwhile, since the heat capacity Ch of the gas mixture (entirety) stagnating in an annular configuration is considered to increase with the instruction fuel injection quantity qfin, the heat capacity Ch can be obtained in accordance with the following Equation (27). In Equation (27), C1 is a proportionality constant. Accordingly, a temperature drop ΔT of the gas mixture (entirety) in each computation cycle stemming from the heat transfer between the gas mixture and the cylinder interior gas and the heat transfer between the gas mixture and the wall of the cavity 24*d* can be represented by the following Equation (28). The temperature drop ΔT calculated in this manner assumes a smaller value as the heat capacity Ch (therefore, the fuel injection quantity qfin) increases when the respective heat transfer quantities are constant.

$$Ch=C1\cdot q\text{fin} \quad (27)$$

$$\Delta T=(Q\text{gas}+Q\text{wall})/Ch \quad (28)$$

The present apparatus repeatedly calculates the gas mixture travel distance X in the above-described manner after the start of the injection, and when the condition "the mixture travel distance X≧the combustion chamber inner wall surface distance Xwall" is satisfied, the present apparatus determines that the gas mixture forefront portion has collided against the inner wall surface of the combustion chamber. After that point in time, the present apparatus repeatedly obtains the temperature drop ΔT, and, in accordance with the following Equation (29), the present apparatus corrects the gas mixture temperature Tmix(k), which is obtained in accordance with the above-described Equation (9).

$$T\text{mix}(k)=T\text{mix}(k)-\Delta T \quad (29)$$

In other words, until the gas mixture forefront portion reaches the inner wall surface of the combustion chamber (the side surface 24*b* of the cavity 24*d*), the gas mixture temperature Tmix(k) is repeated calculated in accordance with the above-described Equation (9); and after the gas mixture forefront portion has reached the inner wall surface of the combustion chamber, the gas mixture temperature Tmix(k) obtained in accordance with the above-described Equation (9) is repeatedly corrected in accordance with Equation (29).

Incidentally, even after combustion, the gas mixture stagnating in an annular configuration can be considered to continuously stagnate in the annular configuration until the gas mixture is discharged to the outside of the combustion chamber. Therefore, the temperature of the above-described "post-ignition gas mixture" (i.e., flame temperature) is also influenced by the cylinder interior gas heat transfer quantity Qgas and the wall surface heat transfer quantity Qwall. In view of this, the present apparatus obtains the temperature of the above-described "post-ignition gas mixture" by correcting the gas mixture temperature Tmix(k), obtained in accordance with the above-described Equation (9), in accordance with Equation (29).

Notably, at the time of ignition the gas mixture temperature increases instantaneously due to combustion. Since this temperature increase changes depending on the excess air factor λ repeatedly calculated in accordance with the above-described Equation (2), the temperature increase can be represented by a function Tburn(λ) whose argument is the excess air factor λ. In view of this, the present apparatus detects the time of ignition on the basis of a change (sharp increase) in the cylinder interior gas pressure Pa detected by means of the cylinder interior pressure sensor 77. When the time of ignition is detected, the present apparatus corrects the gas mixture temperature Tmix(k) only one time through addition of a value Tburn(k), which is determined on the basis of the excess air factor λ at the ignition time, to the gas mixture temperature Tmix(k), which is calculated at the ignition time (or immediately after the ignition time). The above is the outline of the method of estimating the gas mixture temperature (gas mixture temperature Tmix(k)).

Outline of Fuel Injection Control

In general, the quantity of $NO_x$ discharged from an internal combustion engine can be determined on the basis of a change in the flame temperature after the time of ignition (the post-ignition gas mixture temperature Tmix(k)). More specifically, it is known that the quantity of $NO_x$ can be determined through integration with time of the difference between the post-ignition gas mixture temperature Tmix(k) and a reference temperature Tref within a period in which the post-ignition gas mixture temperature Tmix(k) is higher than the reference temperature Tref (hereinafter referred to as "$NO_x$ quantity corresponding area Snox").

Therefore, the present apparatus obtains a target $NO_x$ quantity corresponding area Snoxt corresponding to a target $NO_x$ quantity on the basis of the operation conditions (fuel injection quantity qfin, engine speed NE) of the engine, and obtains the $NO_x$ quantity corresponding area Snox on the basis of a change in the post-ignition gas mixture temperature Tmix(k). Then, the present apparatus feedback-controls the fuel injection start timing and the fuel injection pressure in such a manner that the obtained $NO_x$ quantity corresponding area Snox coincides with the target $NO_x$ quantity corresponding area Snoxt.

Specifically, when the value of the $NO_x$ quantity corresponding area Snox determined for the fuel injection cylinder in the previous computation cycle is greater than the target $NO_x$ quantity corresponding area Snoxt, the present apparatus delays the fuel injection start timing for the fuel injection cylinder in the current computation cycle by a predetermined amount from a base fuel injection timing, and decreases the fuel injection pressure by a predetermined amount from a base fuel injection pressure. Thus, in the current computation cycle, control is performed to decrease the $NO_x$ quantity corresponding area Snox determined for the fuel injection cylinder in the current computation cycle. As a result, the $NO_x$ quantity corresponding area Snox (therefore, the quantity of discharged $NO_x$) determined for the fuel injection cylinder in the current computation cycle is made coincident with the target $NO_x$ quantity corresponding area Snoxt (therefore, the target $NO_x$ quantity).

In contrast, when the value of the $NO_x$ quantity corresponding area Snox determined for the fuel injection cylinder in the previous computation cycle is smaller than the target $NO_x$ quantity corresponding area Snoxt, the present apparatus advances the fuel injection start timing for the fuel injection cylinder in the current computation cycle by a predetermined amount from the base fuel injection timing, and increases the fuel injection pressure by a predetermined amount from the base fuel injection pressure. Thus, in the current computation cycle, control is performed to increase the $NO_x$ quantity corresponding area Snox determined for the fuel injection cylinder in the current computation cycle. As a result, the $NO_x$ quantity corresponding area Snox (therefore, the quantity of discharged $NO_x$) determined for the fuel injection cylinder in the current computation cycle is made coincident with the target $NO_x$ quantity corresponding area Snoxt (therefore, the target $NO_x$ quantity). The above is the outline of fuel injection control.

Actual Operation

Next, actual operations of the control apparatus of the engine having the above-described configuration will be described.

<Control of Fuel Injection Quantity Control, Etc.>

Figure 9:
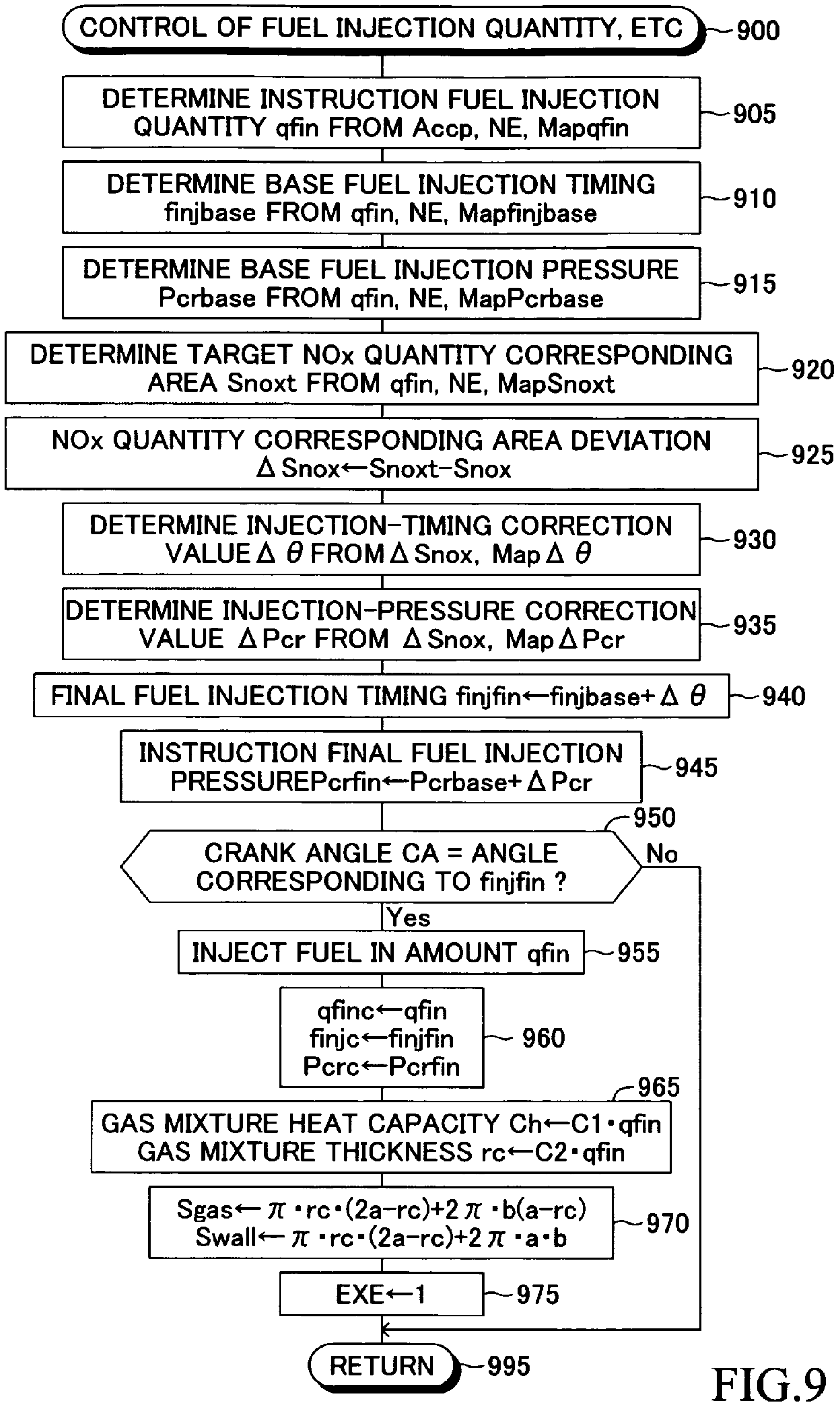
FIG. 9 is a flowchart showing a routine which the CPU shown in FIG. 1 executes so as to control fuel injection quantity, etc.
Figure 10:
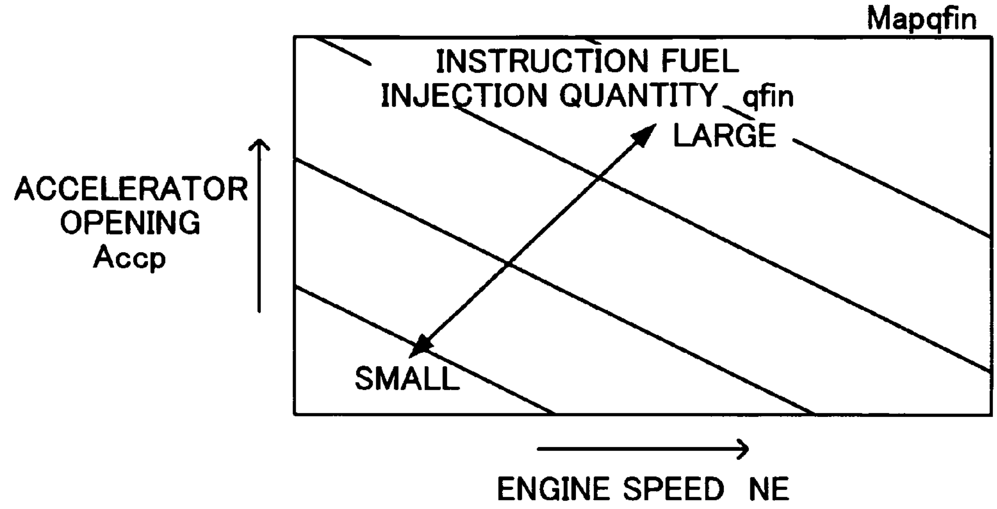
FIG. 10 is a table for determining an instruction fuel injection quantity, to which the CPU shown in FIG. 1 refers during execution of the routine shown in FIG. 9.

The CPU 61 repeatedly executes, at predetermined intervals, a routine shown by the flowchart of FIG. 9 and adapted to control fuel injection quantity, fuel injection timing, and fuel injection pressure. Therefore, when a predetermined timing has been reached, the CPU 61 starts the processing from step 900, and then proceeds to step 905 so as to obtain an accelerator opening Accp, an engine speed NE, and an instruction fuel injection quantity qfin from a table (map) Mapqfin shown in FIG. 10. The table Mapqfin defines the relation between accelerator opening Accp and engine speed NE, and instruction fuel injection quantity qfin; and is stored in the ROM 62.

Figure 11:
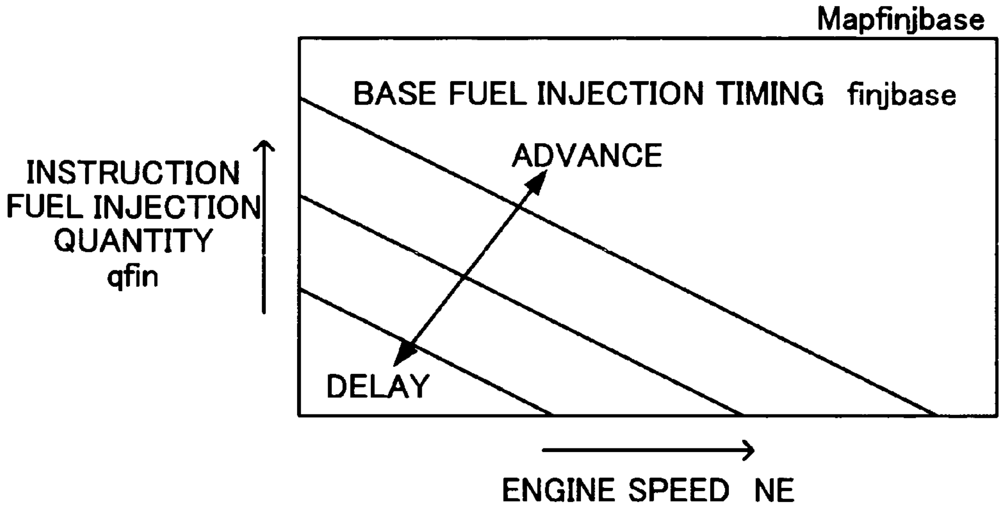
FIG. 11 is a table for determining a base fuel injection timing, to which the CPU shown in FIG. 1 refers during execution of the routine shown in FIG. 9.

Subsequently, the CPU 61 proceeds to step 910 so as to determine a base fuel injection timing finjbase from the instruction fuel injection quantity qfin, the engine speed NE, and a table Mapfinjbase shown in FIG. 11. The table Mapfinjbase defines the relation between instruction fuel injection quantity qfin and engine speed NE, and base fuel injection timing finjbase; and is stored in the ROM 62.

Figure 12:
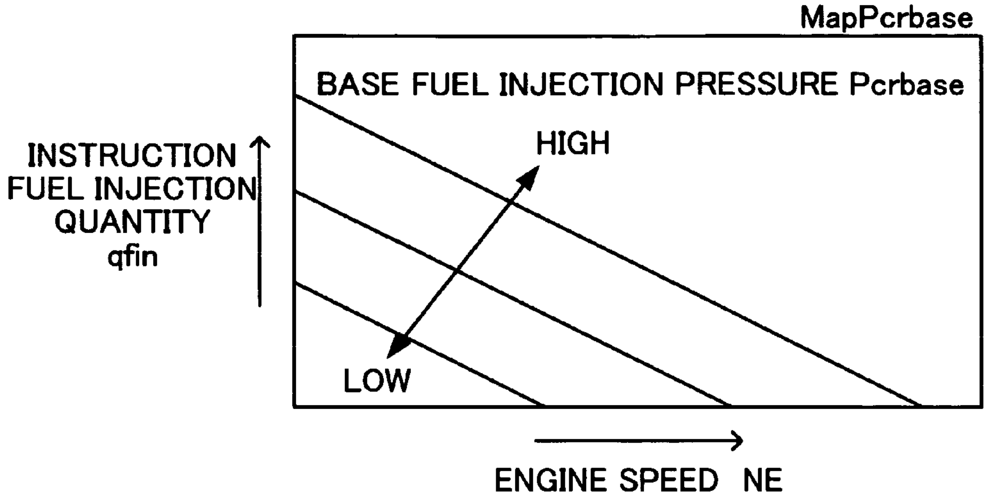
FIG. 12 is a table for determining a base fuel injection pressure, to which the CPU shown in FIG. 1 refers during execution of the routine shown in FIG. 9.

Subsequently, the CPU 61 proceeds to step 915 so as to determine a base fuel injection pressure Pcrbase from the instruction fuel injection quantity qfin, the engine speed NE, and a table MapPcrbase shown in FIG. 12. The table MapPcrbase defines the relation between instruction fuel injection quantity qfin and engine speed NE, and base fuel injection pressure Pcrbase; and is stored in the ROM 62.

Next, the CPU 61 proceeds to step 920 and determines a target $NO_x$ quantity corresponding area Snoxt from the instruction fuel injection quantity qfin, the engine speed NE, and a predetermined table MapSnoxt. The table MapSnoxt defines the relation between instruction fuel injection quantity qfin and engine speed NE, and target $NO_x$ quantity corresponding area Snoxt; and is stored in the ROM 62.

Subsequently, the CPU 61 proceeds to step 925 so as to store, as an $No_x$ quantity corresponding area deviation ΔSnox, a value obtained through subtraction, from the target $NO_x$ quantity corresponding area Snoxt, of the latest $NO_x$ quantity corresponding area Snox (i.e., the value determined for the fuel injection cylinder in the previous computation cycle), which has been obtained in by a routine described later).

Figure 13:
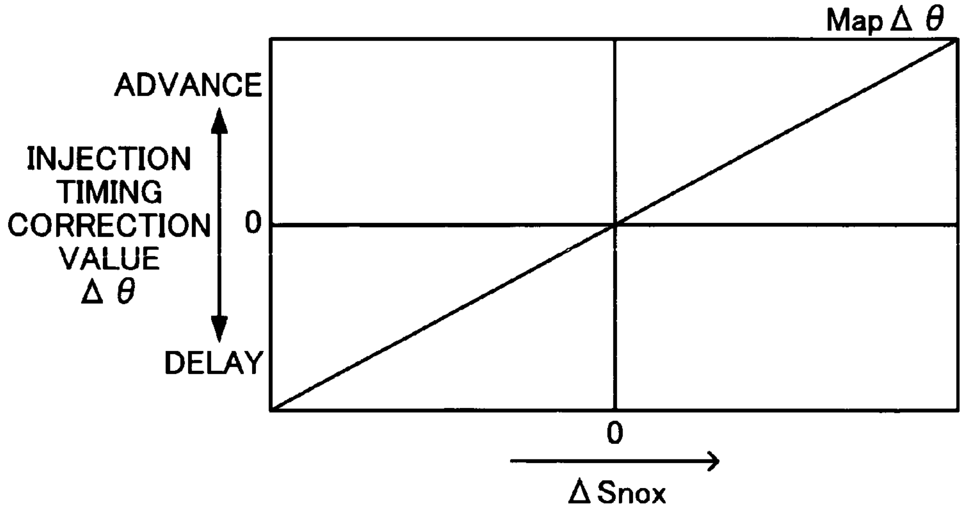
FIG. 13 is a table for determining an injection timing correction value, to which the CPU shown in FIG. 1 refers during execution of the routine shown in FIG. 9.

Subsequently, the CPU 61 proceeds to step 930 so as to determine an injection-timing correction value Δθ on the basis of the $No_x$ quantity corresponding area deviation ΔSnox and with reference to a table MapΔθ shown in FIG. 13. The table MapΔθ defines the relation between $No_x$ quantity corresponding area deviation ΔSnox and injection-timing correction value Δθ, and is stored in the ROM 62.

Figure 14:
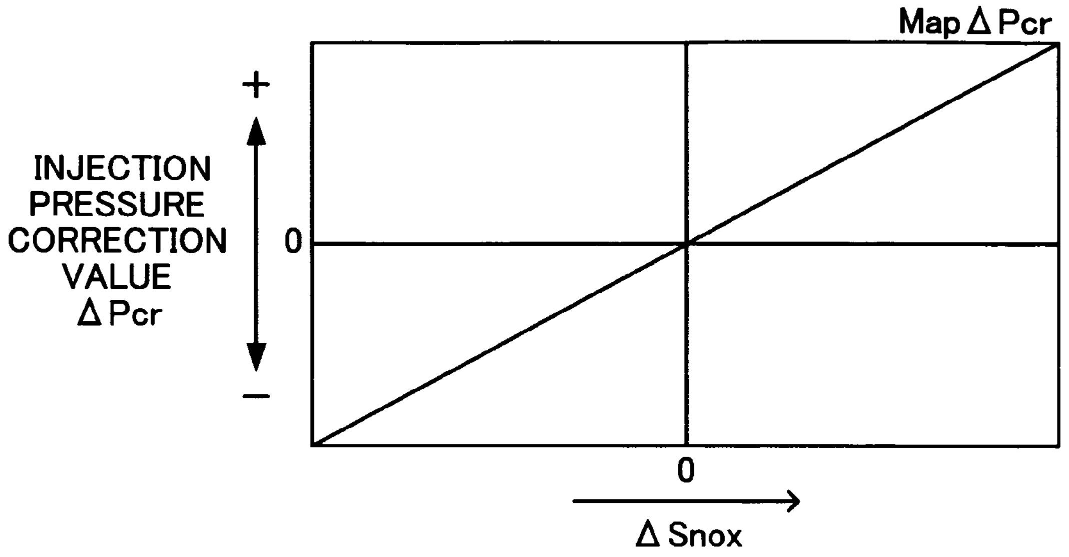
FIG. 14 is a table for determining an injection pressure correction value, to which the CPU shown in FIG. 1 refers during execution of the routine shown in FIG. 9.

After that, the CPU 61 proceeds to step 935 so as to determine an injection-pressure correction value ΔPcr on the basis of the $No_x$ quantity corresponding area deviation ΔSnox and with reference to a table MapΔPcr shown in FIG. 14. The table MapΔPcr defines the relation between $No_x$ quantity corresponding area deviation ΔSnox and injection-pressure correction value ΔPcr, and is stored in the ROM 62.

Next, the CPU 61 proceeds to step 940 so as to correct the base fuel injection timing finjbase by the injection-timing correction value Δθ to thereby obtain a final fuel injection timing finjfin. Thus, the fuel injection timing is corrected in accordance with the $No_x$ quantity corresponding area deviation ΔSnox. As is apparent from FIG. 13, when the $No_x$ quantity corresponding area deviation ΔSnox is positive, the injection-timing correction value Δθ becomes positive, and its magnitude increases with the magnitude of the $No_x$ quantity corresponding area deviation ΔSnox, whereby the final fuel injection timing finjfin is shifted toward the advance side. When the $No_x$ quantity corresponding area deviation ΔSnox is negative, the injection-timing correction value Δθ becomes negative, and its magnitude increases with the magnitude of the $No_x$ quantity corresponding area deviation ΔSnox, whereby the final fuel injection timing finjfin is shifted toward the delay side.

Subsequently, the CPU 61 proceeds to step 945 so as to correct the base fuel injection pressure Pcrbase by the injection-pressure correction value ΔPcr to thereby obtain an instruction final fuel injection pressure Pcrfin. Thus, the fuel injection pressure is corrected in accordance with the $No_x$ quantity corresponding area deviation ΔSnox. As is apparent from FIG. 14, when the $No_x$ quantity corresponding area deviation ΔSnox is positive, the injection-pressure correction value ΔPcr becomes positive, and its magnitude increases with the magnitude of the $No_x$ quantity corresponding area deviation ΔSnox, whereby the instruction final fuel injection pressure Pcrfin is shifted toward the high pressure side. When the $No_x$ quantity corresponding area deviation ΔSnox is negative, the injection-pressure correction value ΔPcr becomes negative, and its magnitude increases with the magnitude of the $No_x$ quantity corresponding area deviation ΔSnox, whereby the instruction final fuel injection pressure Pcrfin is shifted toward the low pressure side. As a result, the discharge pressure of the fuel injection pump 22 is controlled, whereby fuel pressurized to the determined instruction final fuel injection pressure Pcrfin is supplied to the fuel injection valves 21.

In step 950, the CPU 61 determines whether the crank angle CA at the present point in time coincides with an angle corresponding to the determined final fuel injection timing finjfin. When the CPU 61 makes a "Yes" determination in step 950, the CPU 61 proceeds to step 955 so as to cause the fuel injection valve 21 for the relevant fuel injection cylinder to inject the fuel pressurized to the determined instruction final fuel injection pressure Pcrfin in the determined instruction fuel injection quantity qfin.

Subsequently, the CPU 61 proceeds to step 960, and stores the instruction fuel injection quantity qfin as control-use fuel injection quantity qfinc, the final fuel injection timing finjfin as control-use fuel injection timing finjc, and the instruction final fuel injection pressure Pcrfin as control-use fuel injection pressure Pcrc. In step 965 subsequent thereto, the CPU 61 obtains the heat capacity Ch of the gas mixture in accordance with the above-described Equation (27), and the thickness rc of the gas mixture in accordance with the above-described Equation (23).

Subsequently, the CPU 61 proceeds to step 970 so as to obtain the total contract area Sgas in accordance with the equation shown in the box of step 970 corresponding to the above-described Equations (19) and (20), and the total contract area Swall in accordance with the equation shown in the box of step 970 corresponding to the above-described Equations (21) and (22). Then, the CPU 61 proceeds to step 975 so as to change the value of a fuel injection execution flag EXE from "0" to "1," and then proceeds to step 995 so as to end the current execution of the present routine.

The fuel injection execution flag EXE represents that fuel is injected when its value is "1" and that fuel is not injected when its value is "0." When the CPU 61 makes a "No" determination in step 950, the CPU 61 proceeds directly to step 995 so as to end the current execution of the present routine. Through the above-described processing, control of fuel injection quantity, fuel injection timing, and fuel injection pressure is achieved.

<Calculation of Various Physical Quantities at Injection Start Time>

Next, operation for calculating various physical quantities at fuel injection start time will be described. The CPU 61 repeatedly executes, at predetermined intervals, a routine shown by the flowchart of FIG. 15. Therefore, when a predetermined timing has been reached, the CPU 61 starts the processing from step 1500, and then proceeds to step 1505 so as to determine whether the crank angle CA at the present point in time coincides with ATDC-180° (i.e., whether the piston of the fuel injection cylinder is located at bottom dead center of the compression stroke).

The description will be continued under the assumption that the piston of the fuel injection cylinder has not reached bottom dead center of the compression stroke. In this case, the CPU 61 makes a "No" determination in step 1505, and proceeds to step 1515 so as to determine whether the value of the fuel injection execution flag EXE has been changed from "0" to "1" (i.e., whether the present point in time is the fuel injection start time of the fuel injection cylinder).

At the present point in time, the piston has not reached bottom dead center of the compression stroke, and the fuel injection start time has not yet come. Therefore, the CPU 61 makes a "No" determination in step 1515, and proceeds directly to step 1595 so as to end the current execution of the present routine. After that, the CPU 61 repeatedly performs the processing of steps 1500, 1505, 1515, and 1595 until the piston of the fuel injection cylinder reaches bottom dead center of the compression stroke.

Next, the piston of the fuel injection cylinder is assumed to have reached bottom dead center of the compression stroke in this state. In this case, the CPU 61 makes a "Yes" determination when it proceeds to step 1505, and proceeds to step 1510. In step 1510, the CPU 61 stores, as bottom-dead-center cylinder interior gas temperature Tbottom, an intake temperature Tb detected by means of the intake temperature sensor 72 at the present point in time, and stores, as bottom-dead-center cylinder interior gas pressure Pbottom, an intake pipe pressure Pb detected by means of the intake pipe pressure sensor 73 at the present point in time. After making a "No" determination in step 1515, the CPU 61 proceeds directly to step 1595 so as to end the current execution of the present routine. After that, the CPU 61 repeatedly performs the processing of steps 1500, 1505, 1515, and 1595 until the fuel injection start time comes.

Next, the fuel injection start time is assumed to have come after elapse of a predetermined time (i.e., the value of the fuel injection execution flag EXE has been changed from "0" to "1"). In this case, the CPU 61 makes a "Yes" determination when it proceeds to step 1515, and proceeds directly to step 1520 so as to start the processing for calculating various physical quantities at the fuel injection start time. In step 1520, the CPU 61 obtains the total mass Ma of cylinder interior gas in accordance with the above-mentioned Equation (5). At this time, the values set in step 1510 are used as values of Tbottom and Pbottom.

Subsequently, the CPU 61 proceeds to step 1525 so as to obtain a cylinder interior gas density ρa0 as measured at the fuel injection start time, on the basis of the total mass Ma of the cylinder interior gas, the cylinder interior volume Va(CA) at the present point in time, and an equation described in the box of step 1525. Notably, since the crank angle CA at the present point in time coincides with the angle corresponding to the control-use fuel injection timing finjc, the cylinder interior volume Va(CA) at the present point in time is the above-mentioned cylinder interior volume Va0 at the fuel injection start time.

Subsequently, the CPU 61 proceeds to step 1530 so as to obtain a cylinder interior gas pressure Pa0 as measured at the fuel injection start time in accordance with an equation described in the box of step 1530 and corresponding to the above-described Equation (4), and then proceeds to step 1535 so as to set, as an effective injection pressure ΔP, a value obtained through subtraction of the cylinder interior gas pressure Pa0 from the control-use fuel injection pressure Pcrc set in the previously described step 960.

Next, the CPU 61 proceeds to step 1540 so as to obtain a fuel vapor temperature Tf in accordance with the above-described Equation (11). The fuel temperature detected by means of the fuel temperature sensor 76 at the present point in time is used as fuel temperature Tcr. Subsequently, the CPU 61 proceeds to step 1545 so as to determine a spray angle θ on the basis of the cylinder interior gas density ρa0, and the effective injection pressure ΔP, while referring to the above-described table Mapθ.

After that, the CPU 61 proceeds to step 1550 so as to initialize the above-mentioned post injection time t to "0," proceeds to step 1555 so as to set the cavity wall surface arrival flag WALL to "0," and then proceeds to step 1595 so as to end the current execution of the present routine. The cavity wall surface arrival flag WALL indicates that the above-mentioned gas mixture forefront portion has arrived at the cavity inner wall surface when its value is "1," and indicates that the gas mixture forefront portion has not yet arrived at the cavity inner wall surface when its value is "0."

After that, the CPU 61 repeatedly performs the processing of steps 1500, 1505, 1515, and 1595 until the crank angle CA in relation to the fuel injection cylinder again coincides with ATDC-180° (i.e., until the piston of the fuel injection cylinder again reaches bottom dead center of the compression stroke). Through the above-described processing, various physical quantities at the fuel injection start time are calculated.

<Calculation of Gas Mixture Temperature>

Figure 16:
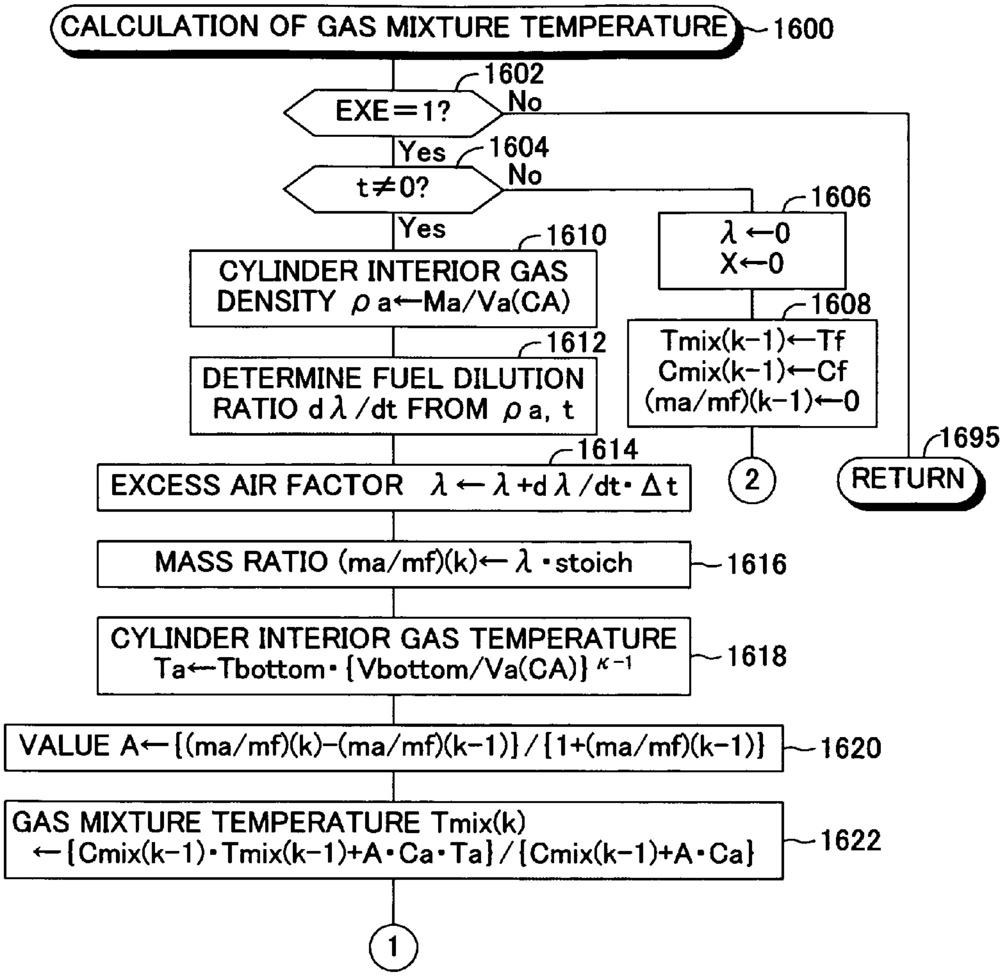
FIG. 16 is a flowchart showing the first half of a routine which the CPU shown in FIG. 1 executes so as to calculate gas mixture temperature.
Figure 17:
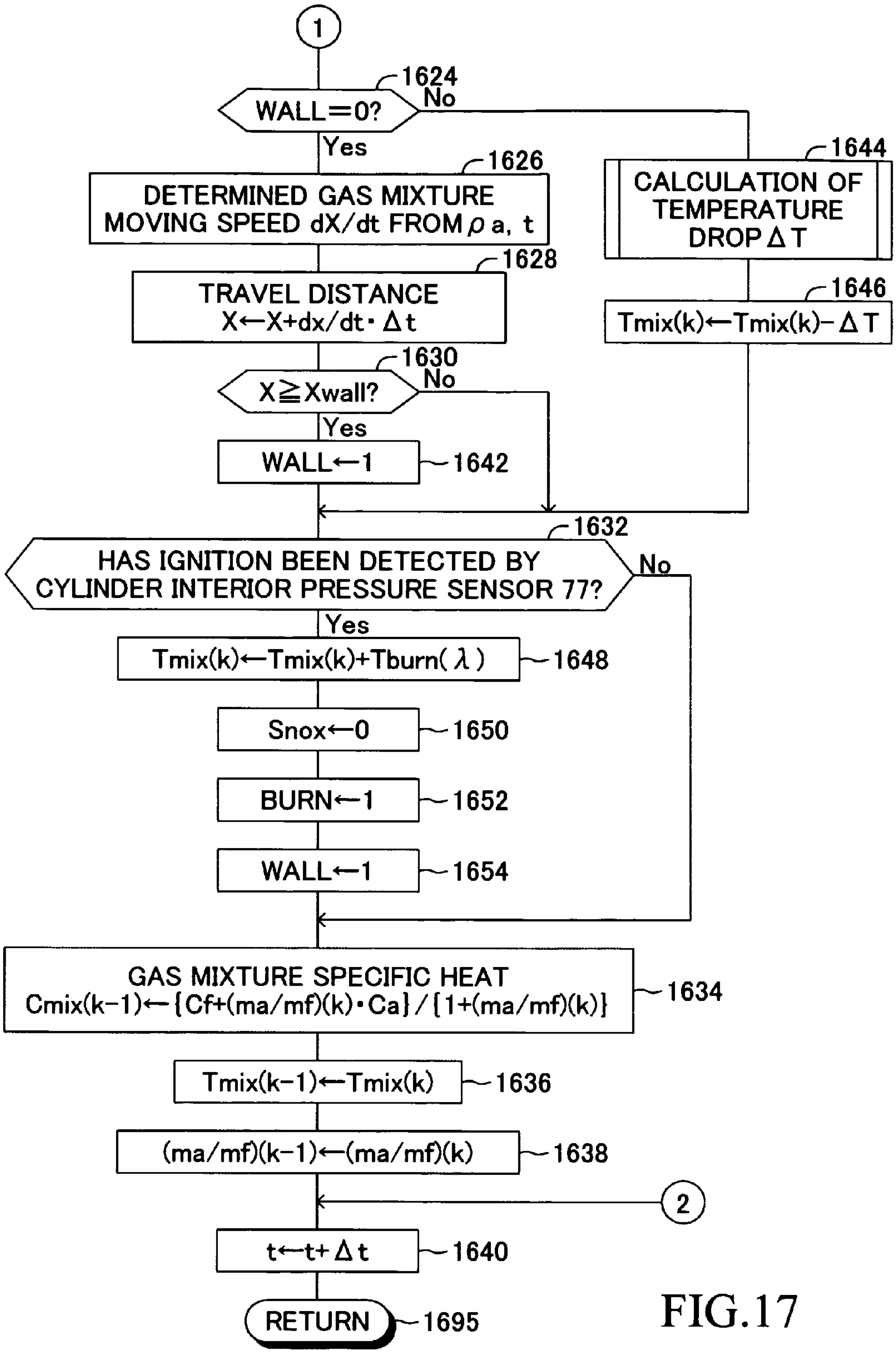
FIG. 17 is a flowchart showing the second half of the routine which the CPU shown in FIG. 1 executes so as to calculate gas mixture temperature.

Meanwhile, the CPU 61 repeatedly executes, at predetermined intervals, a routine shown by the flowcharts of FIGS. 16 and 17 and adapted to calculate gas mixture temperature. Therefore, when a predetermined timing has been reached, the CPU 61 starts the processing from step 1600, and then proceeds to step 1602 so as to determine whether the value of the fuel injection execution flag EXE has been changed to "1." When the CPU 61 makes a "No" determination in step 1602, the CPU 61 proceeds directly to step 1695 so as to end the current execution of the present routine.

Figure 15:
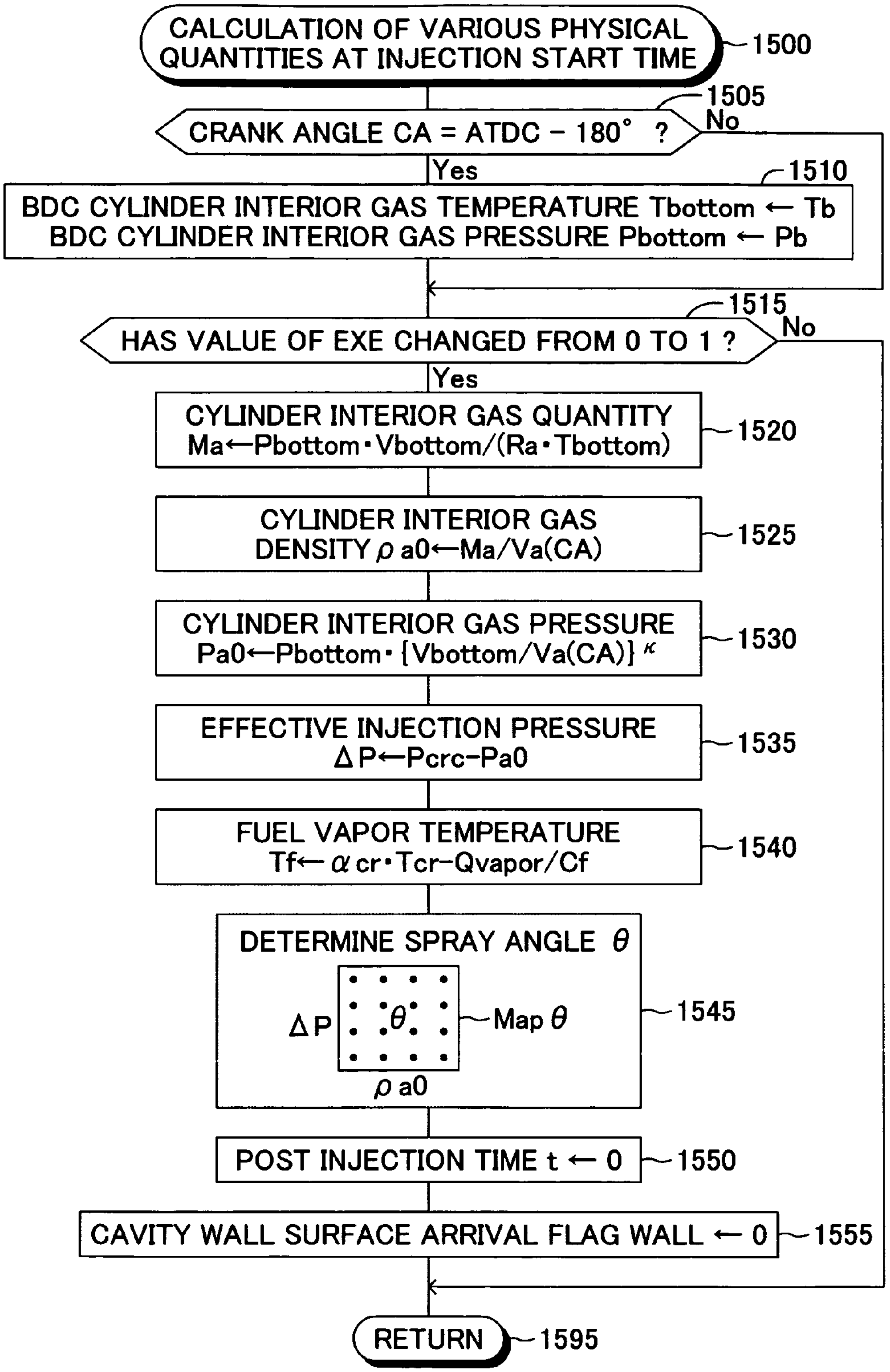
FIG. 15 is a flowchart showing a routine which the CPU shown in FIG. 1 executes so as to calculate various physical quantities at injection start time.

Now, it is assumed that the present point in time is the fuel injection start time (immediately after the value of EXE has been changed from "0" to "1"); i.e, the present crank angle CA coincides with the angle corresponding to the above-mentioned control-use fuel injection timing finjc (accordingly, the present point in time is immediately after the performance of the processing of the previously described steps 1520 to 1555 of FIG. 15). In this case, the CPU 61 makes a "Yes" determination in step 1602, and proceeds directly to step 1604 so as to determine whether post injection time t is non-zero.

The present point in time is immediately after performance of the processing of the previously described step 1550, and post injection time t is "0." Therefore, the CPU 61 makes a "No" determination in step 1604, and proceeds to step 1606 so as to initialize the values of gas mixture travel distance X and excess air factor λ to "0." In step 1608 subsequent thereto, the CPU 61 stores, as gas mixture temperature previous value Tmix(k−1), the fuel vapor temperature Tf calculated in the previously described step 1540 of FIG. 15, stores the value of the specific heat Cf of the fuel vapor as the gas mixture specific heat Cmix(k−1), and stores "0" as the mass ratio previous value (ma/mf)(k−1).

After that, the CPU 61 proceeds to step 1640 of FIG. 17 so as to store, as a new post injection time t, a time obtained through addition of Δt to the present value of the post injection time t ("0" at the present point in time). Subsequently, the CPU 61 proceeds to step 1695 so as to end the current execution of the present routine. Δt represents the intervals at which the present routine is performed.

As a result of the processing in step 1640, the present post injection time t becomes non-zero. Therefore, after this point in time, when the CPU 61 proceeds to step 1604 in the course of repeated execution of the present routine, the CPU 61 makes a "Yes" determination, and then proceeds to step 1610. In step 1610, the CPU 61 obtains the current value of cylinder interior gas density ρa on the basis of the total mass Ma of the cylinder interior gas obtained in the previously described step 1520 of FIG. 15, the current value of cylinder interior volume Va(CA), and an equation described in the box of step 1610.

Subsequently, the CPU 61 proceeds to step 1612 so as to obtain a fuel dilution ratio dλ/dt on the basis of the above-mentioned cylinder interior gas density ρa, the present post injection time t, and the above-mentioned Equation (3), and then proceeds to step 1614 so as to obtain the current value of excess air factor λ through integrating the fuel dilution ratio dλ/dt with time in accordance with the above-mentioned Equation (2). The values calculated in steps 1535 and 1545 of FIG. 15, respectively, are used as values of the effective injection pressure ΔP and spray angle θ in the above-mentioned Equation (3).

Next, the CPU 61 proceeds to step 1616 so as to obtain a mass ratio current value (ma/mf)(k) on the basis of the value of excess air factor λ and in accordance with the equation based on the above-mentioned Equation (1) and described in the box of step 1616. In step 1618 subsequent thereto, the CPU 61 obtains the current value of cylinder interior gas temperature Ta on the basis of the current value of cylinder interior volume Va(CA) and the above-mentioned Equation (7).

Subsequently, in step 1620, in accordance with the above-described Equation (10), the CPU 61 obtains the value A on the basis of the mass ratio current value (ma/mf)(k) obtained in step 1616 and the mass ratio previous value (ma/mf(k−1) stored in step 1638, which will be described later, during the previous execution of the present routine (stored in the previously described step 1608 only during the current execution of the present routine).

Next, in step 1622, in accordance with the above-described Equation (9), the CPU 61 obtains the gas mixture temperature current value Tmix(k) on the basis of the gas mixture specific heat Cmix(k−1) stored in step 1634, which will be described later, during the previous execution of the present routine (stored in the previously described step 1608 only during the current execution of the present routine and the gas mixture temperature previous value Tmix(k−1) stored in step 1636, which will be described later, during the previous execution of the present routine (stored in the previously described step 1608 only during the current execution of the present routine, the value A, and the cylinder interior gas temperature Ta.

Next, the CPU 61 proceeds to step 1624, and determines whether the value of the cavity wall surface arrival flag WALL is "0." At the present point in time, the value of the cavity wall surface arrival flag WALL is "0," because of the processing of the previously described step 1555. Therefore, the CPU 61 makes a "Yes" determination in step 1624 and then proceeds to step 1626 so as to calculate the gas mixture moving speed dX/dt based on the value of the cylinder interior gas density ρa obtained in step 1610 and the present value of the post injection time t, and in accordance with the above-described Equation (13). In step 1628 subsequent thereto, the CPU 61 integrates the gas mixture moving speed dX/dt with time in accordance with the above-described Equation (12) to thereby obtain the gas mixture travel distance X at the present point in time. The values calculated in steps 1535 and 1545, respectively, of FIG. 15 are used as values of the effective injection pressure ΔP and spray angle θ in the above-mentioned Equation (13).

Next, the CPU 61 proceeds to step 1630, and determines whether the gas mixture travel distance X is not less than the combustion chamber inner wall surface distance Xwall (i.e., whether the gas mixture forefront portion has reached the inner wall surface of the combustion chamber). Here, the description is continued under the assumption that the gas mixture forefront portion has not yet reached the inner wall surface of the combustion chamber and ignition has not yet occurred. In this case, the CPU 61 makes a "No" determination in step 1630, and proceeds directly to step 1632. In step 1632, the CPU 61 monitors and determines whether ignition has been detected on the basis of a change in the cylinder interior gas pressure Pa of the fuel injection cylinder sensed by means of the cylinder interior pressure sensor 77.

Since ignition has not yet occurred at the present point in time, the CPU 61 makes a "No" determination in step 1632, and proceeds directly to step 1634. In step 1634, the CPU 61 calculates the gas mixture specific heat Cmix(k−1) on the basis of the mass ratio current value (ma/mf)(k) calculated in the previously described step 1616 and in accordance with an equation corresponding to the above-described Equation (6).

Subsequently, the CPU 61 proceeds to step 1636, and stores, as the gas mixture temperature previous value Tmix (k−1), the value of the gas mixture temperature current value Tmix(k) obtained in the previously described step 1622. In step 1638, the CPU 61 stores, as the mass ratio previous value (ma/mf)(k−1), the value of the mass ratio current value (ma/mf)(k) obtained in the previously described step 1616. After that, the CPU 61 increases the value of the post injection time t by Δt in step 1640, and proceeds to step 1695 so as to complete the current execution of the present routine.

Before the gas mixture forefront portion reaches the inner wall surface of the combustion chamber and ignition occurs, the CPU 61 repeatedly executes the processing of steps 1600 to 1604, 1610 to 1630, 1632, and 1634 to 1640, whereby the gas mixture temperature current value Tmix(k) serving as adiabatic gas mixture temperature is repeated updated in step 1622.

Next, the case where the gas mixture forefront portion has reached the inner wall surface of the combustion chamber (i.e., the gas mixture has started stagnation in an annular configuration) will be described. In this case, the CPU 61 makes a "Yes" determination when it proceeds to step 1630, and then proceeds to step 1642 so as to change the value of the cavity wall surface arrival flag WALL form "0" to "1." As a result, after that point in time, the CPU 61 makes a "No" determination when it proceeds to step 1624, and then proceeds to step 1644 so as to calculate the temperature drop ΔT.

<Calculation of Temperature Drop>

Figure 18:
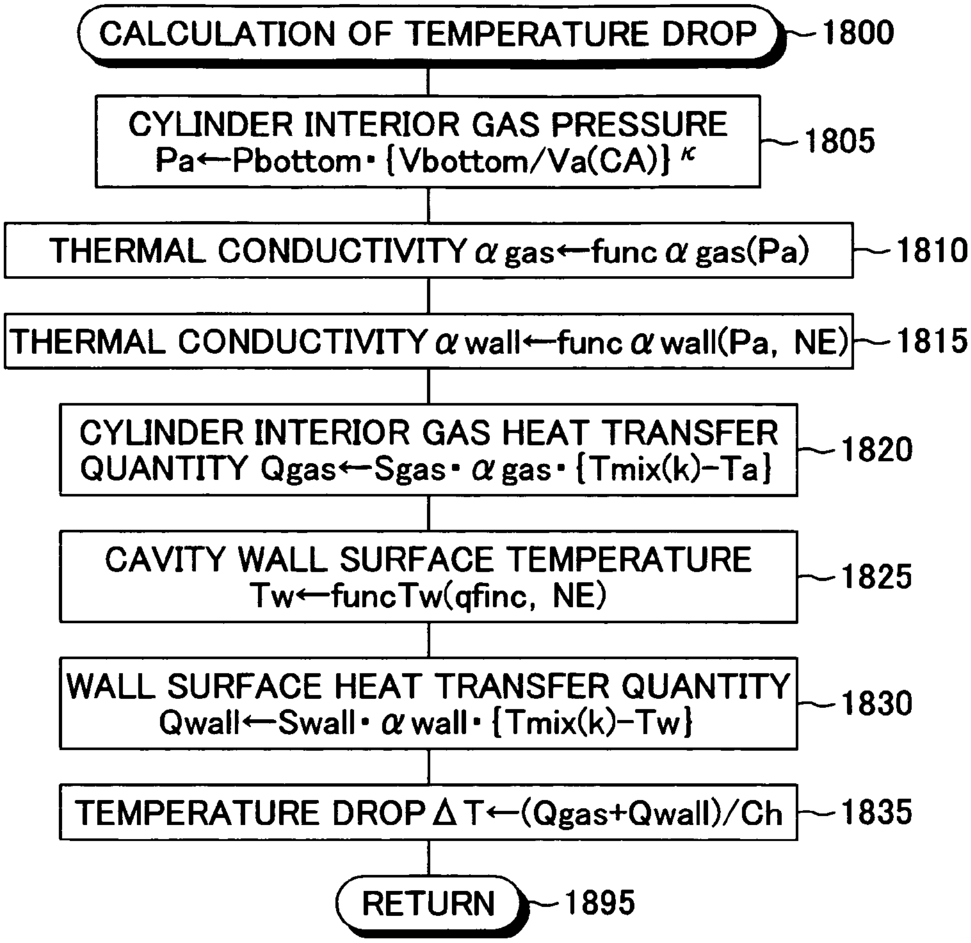
FIG. 18 is a flowchart showing a routine which the CPU shown in FIG. 1 executes so as to calculate temperature drop.

In order to calculate the temperature drop ΔT, the CPU 61 starts the routine sown by the flowchart of FIG. 18 from step 1800, and then proceeds to step 1805 so as to obtain the cylinder interior gas pressure Pa at the present point in time in accordance with the above-described Equation (24). The value set in step 1510 is used as Pbottom, and the value of the crank angle CA at the present point in time is used.

Next, the CPU 61 proceeds to step 1810 so as to calculate the thermal conductivity αgas on the basis of the cylinder interior gas pressure Pa and by use of the function funcαgas, and then proceeds to step 1815 so as to calculate the thermal conductivity αwall on the basis of the cylinder interior gas pressure Pa and the engine speed NE at the present point in time, and by use of the function funcαwall.

Subsequently, the CPU 61 proceeds to step 1820 so as to calculates the cylinder interior gas heat transfer quantity Qgas in accordance with the above-described Equation (25) and on the basis of the total contract area Sgas obtained in the previously described step 970, the thermal conductivity αgas, the latest gas mixture temperature current value Tmix(k) obtained by the routines of FIGS. 16 and 17, and the cylinder interior gas temperature Ta obtained in the previously described step 1618.

Next, the CPU 61 proceeds to step 1825 so as to calculate the cavity wall surface temperature Tw on the basis of the control-use fuel injection quantity qfinc stored in the previously described step 960 and the engine speed NE at the present point in time, and by use of the function funcTw. In step 1830, the CPU 61 calculates the wall surface heat transfer quantity Qwall in accordance with the above-described Equation (26) and on the basis of the total contract area Swall obtained in the previously described step 970, the thermal conductivity αwall, the latest gas mixture temperature current value Tmix(k) obtained by the routines of FIGS. 16 and 17, and the cavity wall surface temperature Tw.

The CPU 61 then proceeds to step 1835 so as to calculate the temperature drop ΔT in accordance with the above-described Equation (28) and on the basis of the cylinder interior gas heat transfer quantity Qgas, the wall surface heat transfer quantity Qwall, and the gas mixture heat capacity Ch stored in the previously described step 965. Subsequently, via step 1895, the CPU 61 proceeds to step 1646 of FIG. 17.

In step 1646, the CPU 61 stores, as a new gas mixture temperature current value Tmix(k), a value obtained through subtraction of the obtained temperature drop ΔT from the latest gas mixture temperature current value Tmix(k) updated in the previously described step 1622, whereby the gas mixture temperature is corrected. After that, the CPU 61 performs the processing of step 1632 and subsequent steps.

After that, until ignition occurs, the CPU 61 repeatedly performs the processing of steps 1600 to 1604, 1610 to 1624, 1644, 1646, 1632, and 1634 to 1640. As a result, step 1646 is repeatedly preformed, whereby the gas mixture temperature current value Tmix(k) serving as adiabatic gas mixture temperature is corrected by the temperature drop ΔT in each computation cycle.

Next, the case where ignition has occurred in this state will be described. In this case, the CPU 61 makes a "Yes" determination when it proceeds to step 1632, and then proceeds step 1648 so as to obtain the combustion-attributable temperature elevation Tburn(λ) and store, as a new gas mixture temperature current value Tmix(k), a value obtained through addition of the temperature elevation Tburn(λ) to the latest gas mixture temperature current value Tmix(k) calculated in the previously described step 1646, whereby the gas mixture temperature is corrected. At this time, λ is the latest excess air factor λ calculated in the previously described step 1614. Notably, the temperature elevation Tburn(λ) is a function which provides a value which becomes maximum when λ is the stoichiometric air-fuel ratio stoich, and decreases as the deviation of λ from the stoichiometric air-fuel ratio stoich increases, when such a deviation is produced.

Next, the CPU 61 proceeds to step 1650 so as to initialize the value of the $NO_x$ quantity corresponding area Snox to "0," proceeds to step 1652 so as to change the value of a combustion occurrence flag BURN from "0" to "1," and then proceeds to step 1654 so as to set the value of the cavity wall surface arrival flag WALL to "1." After that, the CPU 61 performs the processing of step 1634 and subsequent steps. The combustion occurrence flag BURN represents that ignition is currently occurring when its value is "1" and represents that ignition does not currently occur when its value is "0."

Notably, as in the case of the present point in time where ignition occurs after the gas mixture forefront portion has reached the wall surface of the combustion chamber, the value of WALL has already been set to "1" upon execution of the above-described step 1642. Therefore, even when the processing of step 1654 is performed, the value of WALL does not change. In other words, in the case where ignition occurs before the gas mixture forefront portion reaches the wall surface of the combustion chamber, through performance of the processing of step 1654, the value of WALL is immediately changed from "0" to "1." This is because the energy of ignition (explosion) can be considered to cause the gas mixture to immediately reach the combustion chamber wall surface and stagnate in an annular configuration.

After that, insofar as the value of the fuel injection execution flag EXE is maintained at "1" (unless step 1920 of FIG. 19 to be described later is not performed), the CPU 61 repeatedly performs the processing of steps 1600 to 1604, 1610 to 1624, 1644, 1646, 1632, and 1634 to 1640. As a result, step 1646 is repeatedly preformed, whereby the post-ignition mixture temperature current value (i.e., flame temperature) Tmix (k) serving as adiabatic gas mixture temperature is corrected by the temperature drop ΔT in each computation cycle.

<Calculation of $NO_x$ Quantity Corresponding Area>

Figure 19:
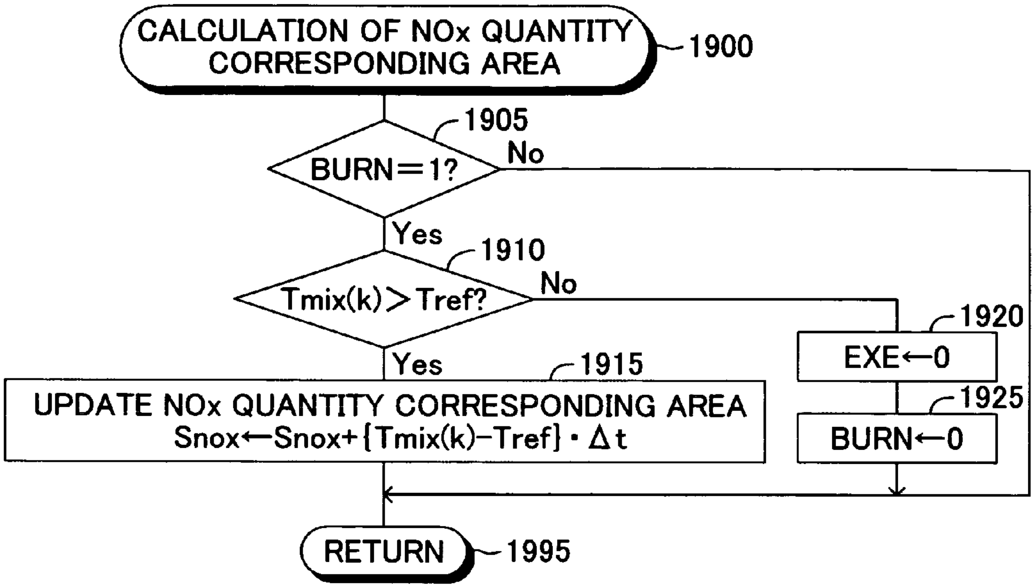
FIG. 19 is a flowchart showing a routine which the CPU shown in FIG. 1 executes so as to calculate $NO_x$ quantity corresponding area.

In order to calculate the $NO_x$ quantity corresponding area Snox, the CPU 61 repeatedly executes the routine sown by the flowchart of FIG. 19 at predetermined intervals. Therefore, when a predetermined timing has been reached, the CPU 61 starts the processing from step 1900, and then proceeds to step 1905 so as to determine whether the value of the combustion occurrence flag BURN is "1." When the CPU 61 makes a "No" determination in step 1905, the CPU 61 proceeds directly to step 1995 so as to end the current execution of the present routine.

Here, it is assumed that the present point in time is immediately after execution of the previously described step 1652 (and step 1650) (i.e., immediately after occurrence of ignition). In this case, the CPU 61 makes a "Yes" determination in step 1905, the CPU 61 proceeds to step 1910 so as to determine whether the latest gas mixture temperature current value Tmix(k) obtained by the routines of FIGS. 16 and 17 is higher than the reference temperature Tref.

Since the present point in time is immediately after the ignition has occurred, the gas mixture temperature current value Tmix(k) is higher than the reference temperature Tref due to execution of the previously described step 1648. Accordingly, the CPU 61 makes a "Yes" determination in step 1910, and proceeds to 1915 so as to update the $NO_x$ quantity corresponding area Snox by replacing it with a new $NO_x$ quantity corresponding area Snox obtained through addition of "(Tmix(k)−Tref)−Δt" to the current value of the $NO_x$ quantity corresponding area Snox (at the present point in time, the value is "0" due to execution of step 1650). After that, the CPU 61 proceeds to step 1995 so as to end the current execution of the present routine.

After that, insofar as the gas mixture temperature current value Tmix(k) is higher than the reference temperature Tref, the CPU 61 repeatedly performs the processing of steps 1900 to 1915. As a result, the value of the $NO_x$ quantity corresponding area Snox is repeatedly updated in step 1915. When the gas mixture temperature current value Tmix(k) becomes equal to or lower than the reference temperature Tref due to, for example, an increase in the volume of the combustion chamber, the CPU 61 makes a "NO" determination in step 1910, and then proceeds to step 1920 so as to change the value of the fuel injection execution flag EXE from "1" to "0." Subsequently, the CPU 61 proceeds to step 1925 so as to change the value of the combustion occurrence flag BURN from "1" to "0," and then proceeds to step 1995 so as to end the current execution of the present routine.

Since the value of the combustion occurrence flag BURN has become "0" as a result of the processing of step 1925, the CPU 61 makes a "No" determination when it proceeds to 1905, and proceeds directly to step 1995. As a result, updating of the $NO_x$ quantity corresponding area Snox ends, the value calculated at this point in time coincides with the value obtained through integration with time of the difference between the post-ignition gas mixture temperature Tmix(k) and the reference temperature Tref over the period in which the post-ignition gas mixture temperature Tmix(k) is higher than the reference temperature Tref (i.e., the value determining the quantity of $NO_x$). Subsequently, the value Snox is used in step 925 of the routine of FIG. 9 which is executed for the nest fuel injection cylinder. As a result, the fuel injection timing and fuel injection pressure of the engine are feedback-controlled on the basis of the vale Snox.

Since the value of the fuel injection execution flag EXE becomes "0" due to the above-described processing, the CPU 61 makes a "No" determination when it proceeds to step 1602 of FIG. 16, and proceeds directly to step 1695. As a result, the calculation (update) of the (post-ignition) gas mixture temperature (i.e., flame temperature) Tmix(k) ends. The calculation of the gas mixture temperature Tmix(k) is resumed when fuel is injected into the next fuel injection cylinder and step 975 is executed again.

As described above, in the embodiment of the engine control apparatus which performs the gas mixture temperature estimation method according to the present invention, before the gas mixture forefront portion reaches the inner wall surface of the combustion chamber (the side surface 24*b* of the cavity 24*d*), the gas mixture temperature Tmix(k) serving as the adiabatic gas mixture temperature is repeatedly calculated in accordance with only the above-described Equation (9) (step 1622), which is based on the assumption that no heat exchange occurs between the gas mixture and the cylinder interior gas which exists around the gas mixture without mixing with fuel (peripheral cylinder interior gas). After the gas mixture forefront portion reaches the inner wall surface of the combustion chamber, the gas mixture temperature Tmix (k) calculated in accordance with the above-described Equation (9) is repeated corrected in consideration of the quantity Qgas of heat transfer between the gas mixture and the cylinder interior gas existing around the gas mixture in contact therewith and the quantity Qwall of heat transfer between the gas mixture and the wall of the cavity 24*d* in contact with the gas mixture, under the assumption that the entire gas mixture loses the momentum due to collision against the side wall of the combustion chamber (side surface 24*b*), and stagnates in an annular configuration in the vicinity of the side surface 24*b* (see the above-described Equation (29) and step 1646).

Accordingly, in the case where the gas mixture is considered to stagnate in an annular configuration in the vicinity of the side wall of the combustion chamber (for example, in the case where a gas mixture is ignited after the gas mixture has reached the inner wall surface of the combustion chamber, a period between a point in time when the gas mixture reaches the inner wall surface of the combustion chamber and a point in time when the gas mixture is ignited, and a period between the time of ignition and a point in time when a post-ignition gas mixture is discharged to the outside of the combustion chamber), the above-described heat transfer is taken into consideration, whereby the gas mixture temperature Tmix(k) can be accurately estimated before and after the ignition. Accordingly, the ignition timing of the gas mixture and the $NO_x$ quantity which greatly depends on a change with time of the post-ignition gas mixture temperature (accordingly, discharge gas temperature) can be controlled more accurately.

The present invention is not limited to the above-described embodiment, and may be modified in various manners within the scope of the present invention. For example, the following modifications may be employed. In the above-described embodiment, the manner of fuel injection (injection timing, injection pressure) is feedback-controlled in such a manner that the $NO_x$ quantity corresponding area Snox calculated on the basis of the gas mixture temperature Tmix(k) (see step 1915) coincides with the target $NO_x$ quantity corresponding area Snoxt (step 920). However, the embodiment may be modified in such a manner that a target ignition time and a target gas mixture temperature at the target ignition time are set on the basis of, for example, the operation state of the engine, and the manner of fuel injection is feedback-controlled so that the gas mixture temperature Tmix(k) calculated at the target ignition time coincides with the target gas mixture temperature.

In the above-described embodiment, the entire gas mixture is assumed to stagnate in an annular configuration in the vicinity of the side wall of the combustion chamber (side surface 24*b*) after the gas mixture forefront portion reaches the inner wall surface of the fuel combustion chamber. However, the entire gas mixture may be assumed to stagnate in a generally annular configuration in the vicinity of the side wall of the combustion chamber immediately after start of fuel injection. In this case, from a point in time immediately after start of fuel injection, the heat transfer between the gas mixture and the cylinder interior gas and the heat transfer between the gas mixture and the wall of the combustion chamber are taken into consideration in calculation of the gas mixture temperature Tmix(k).

In the above-described embodiment, the thickness rc of the gas mixture stagnating in an annular configuration is calculated as a value which changes depending only on the fuel injection quantity qfin (see the above-described Equation (23) and step 965). However, the thickness rc of the gas mixture may be calculated as a value which changes depending not only on the fuel injection quantity qfin but also on at least one of the cylinder interior gas pressure Pa, the cylinder interior gas temperature Ta, and the gas mixture excess air factor λ.

In the above-described embodiment, the cylinder interior gas pressure Pa is calculated in accordance with an equation which represents adiabatic changes of a gas (see steps 1530 and 1805). However, the cylinder interior gas pressure Pa may be detected by use of the cylinder interior pressure sensor 77.

The invention claimed is:

1. A gas mixture temperature estimation method for an internal combustion, the method comprising:

estimating a temperature of a gas mixture produced through mixing of fuel injected into a combustion chamber of the internal combustion engine and a cylinder interior gas, which is a gas having been taken into the combustion chamber, wherein:

when the gas mixture does not stagnate, a heat transfer does not occur between the gas mixture and an object or substance existing around the gas mixture and the temperature of the gas mixture is calculated based on a quantity of a heat of the fuel injected into the combustion chamber and a quantity of a heat of the cylinder interior gas, and when the gas mixture stagnates in a generally annular configuration in the vicinity of a side wall of the combustion chamber, the heat transfer occurs between the gas mixture and the object or substance existing around the gas mixture during a period in which the gas mixture stagnates and the temperature of the gas mixture is calculated based on the quantity of the heat of the fuel injected into the combustion chamber, the quantity of the heat of the cylinder interior gas, and a quantity of a heat transferred between the gas mixture and the object or substance existing around the gas mixture.

2. The gas mixture temperature estimation method for an internal combustion engine according to claim 1, wherein the temperature of the gas mixture is estimated when the stagnation of the gas mixture occurs after the gas mixture reaches an inner wall surface of the combustion chamber.

3. The gas mixture temperature estimation method for an internal combustion engine according to claim 1, wherein the object or substance existing around the gas mixture comprises the wall of the combustion chamber in contact with the gas mixture and the cylinder interior gas in contact with the gas mixture.

4. The gas mixture temperature estimation method for an internal combustion engine according to claim 2, wherein the object or substance existing around the gas mixture comprises the wall of the combustion chamber in contact with the gas mixture and the cylinder interior gas in contact with the gas mixture.

5. The gas mixture temperature estimation method for an internal combustion engine according to claim 3, wherein the quantity of heat transferred between the gas mixture and the wall of the combustion chamber is calculated on the basis of an area of contact and a thermal conductivity between the gas mixture and the wall of the combustion chamber; and the quantity of heat transferred between the gas mixture and the cylinder interior gas is calculated on the basis of an area of contact and a thermal conductivity between the gas mixture and the cylinder interior gas.

6. The gas mixture temperature estimation method for an internal combustion engine according to claim 4, wherein the quantity of heat transferred between the gas mixture and the wall of the combustion chamber is calculated on the basis of an area of contact and a thermal conductivity between the gas mixture and the wall of the combustion chamber; and the quantity of heat transferred between the gas mixture and the cylinder interior gas is calculated on the basis of an area of contact and a thermal conductivity between the gas mixture and the cylinder interior gas.

7. The gas mixture temperature estimation method for an internal combustion engine according to claim 5, wherein the thermal conductivity between the gas mixture and the wall of the combustion chamber and the thermal conductivity between the gas mixture and the cylinder interior gas are individually changed in accordance with pressure of the cylinder interior gas.

8. The gas mixture temperature estimation method for an internal combustion engine according to claim 6, wherein the thermal conductivity between the gas mixture and the wall of the combustion chamber and the thermal conductivity between the gas mixture and the cylinder interior gas are individually changed in accordance with pressure of the cylinder interior gas.

9. The gas mixture temperature estimation method for an internal combustion engine according to claim 5, wherein the thermal conductivity between the gas mixture and the wall of the combustion chamber is changed in accordance with a value representing the speed of a flow of the gas mixture generated by a swirl.

10. The gas mixture temperature estimation method for an internal combustion engine according to claim 6, wherein the thermal conductivity between the gas mixture and the wall of the combustion chamber is changed in accordance with a value representing the speed of a flow of the gas mixture generated by a swirl.

11. The gas mixture temperature estimation method for an internal combustion engine according to claim 7, wherein the thermal conductivity between the gas mixture and the wall of the combustion chamber is changed in accordance with a value representing the speed of a flow of the gas mixture generated by a swirl.

12. The gas mixture temperature estimation method for an internal combustion engine according to claim 8, wherein the thermal conductivity between the gas mixture and the wall of the combustion chamber is changed in accordance with a value representing the speed of a flow of the gas mixture generated by a swirl.

13. The gas mixture temperature estimation method for an internal combustion engine according to claim 2, wherein an increasing quantity of the cylinder interior gas is mixed with the fuel over time.

14. The gas mixture temperature estimation method for an internal combustion engine according to claim 1, further comprising estimating a traveling distance over which the gas mixture travels from an injection opening successively after the injection of fuel.

* * * * *